US012802191B2

(12) United States Patent
Oami

(10) Patent No.: US 12,802,191 B2
(45) Date of Patent: Nov. 17, 2026

(54) EVALUATION APPARATUS, EVALUATION METHOD, AND NON-TRANSITORY STORAGE MEDIUM

(71) Applicant: NEC Corporation, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/581,471

(22) Filed: Feb. 20, 2024

(65) Prior Publication Data

US 2024/0193748 A1 Jun. 13, 2024

Related U.S. Application Data

(63) Continuation of application No. 17/713,638, filed on Apr. 5, 2022, now abandoned, which is a continuation (Continued)

(51) Int. Cl.
*G06T 7/00* (2017.01)
*G06T 7/20* (2017.01)

(Continued)

(52) U.S. Cl.
CPC ............. *G06T 7/0002* (2013.01); *G06T 7/20* (2013.01); *G06T 7/70* (2017.01); *H04N 7/18* (2013.01);

(Continued)

(58) Field of Classification Search
None
See application file for complete search history.

(56) References Cited

U.S. PATENT DOCUMENTS

| | | | | |
|---|---|---|---|---|
| 5,486,819 A | 1/1996 | Horie | G08G 1/164 | 348/148 |
| 2008/0198159 A1 | 8/2008 | Liu | G08B 13/19641 | 345/420 |

(Continued)

FOREIGN PATENT DOCUMENTS

| | | |
|---|---|---|
| JP | H07-049952 A | 2/1995 |
| JP | 2005-286619 A | 10/2005 |

(Continued)

OTHER PUBLICATIONS

Japanese Office Action for JP Application No. 2023-015841, mailed on Apr. 2, 2024 with English Translation.

(Continued)

*Primary Examiner* — James M Anderson, II
(74) *Attorney, Agent, or Firm* — Sughrue Mion, PLLC

(57) ABSTRACT

An evaluation apparatus (10) includes an acquisition unit (110), an index computation unit (120), and a suitability computation unit (140). The acquisition unit (110) acquires arrangement information and environmental information. The arrangement information indicates at least any of position, orientation and field angle of an image capturing apparatus. The environmental information indicates an environment of a target region. The index computation unit (120) computes a surveillance index by using the arrangement information and the environmental information, the surveillance index indicating difficulty or easiness of surveilling a target object. The suitability computation unit (140) computes suitability of arrangement of the image capturing apparatus indicated by the arrangement information, based on the distribution of the surveillance index in the target region.

20 Claims, 20 Drawing Sheets

Related U.S. Application Data of application No. 17/262,964, filed as application No. PCT/JP2018/028557 on Jul. 31, 2018, now Pat. No. 11,328,404.

(51) Int. Cl.

| | |
|---|---|
| ***G06T 7/70*** | (2017.01) |
| ***H04N 7/18*** | (2006.01) |
| ***H04N 17/00*** | (2006.01) |

(52) U.S. Cl.

CPC . *H04N 17/002* (2013.01); *G06T 2207/30168* (2013.01); *G06T 2207/30232* (2013.01); *G06T 2207/30244* (2013.01)

(56) References Cited

U.S. PATENT DOCUMENTS

| | | | | |
|---|---|---|---|---|
| 2015/0310273 | A1 | 10/2015 | Shreve | G06T 5/77 382/103 |
| 2015/0339537 | A1 | 11/2015 | Ikeda | |
| 2016/0133021 | A1 | 5/2016 | Gouda | G06V 20/52 382/103 |
| 2017/0010623 | A1* | 1/2017 | Tang | H04N 23/90 |
| 2018/0046187 | A1* | 2/2018 | Martirosyan | G05D 1/0094 |
| 2018/0343442 | A1 | 11/2018 | Yoshikawa et al. | |

FOREIGN PATENT DOCUMENTS

| | | | | |
|---|---|---|---|---|
| JP | 2011-086995 | A | | 4/2011 |
| JP | 2012-156672 | A | | 8/2012 |
| JP | 2014-036414 | A | | 2/2014 |
| JP | 2014-150483 | A | | 8/2014 |
| JP | 2015-088819 | A | | 5/2015 |
| JP | 2015-132535 | A | | 7/2015 |
| JP | 2016119627 | A | * | 6/2016 |
| JP | 2016-127571 | A | | 7/2016 |
| JP | 2016197980 | A | * | 11/2016 |
| JP | 2017-139725 | A | | 8/2017 |
| JP | 2018055362 | A | * | 4/2018 |
| WO | 2014/002398 | A1 | | 1/2014 |
| WO | 2014/103673 | A1 | | 7/2014 |
| WO | 2014/203523 | A1 | | 12/2014 |
| WO | 2018/021487 | A1 | | 2/2018 |

OTHER PUBLICATIONS

International Search Report for PCT Application No. PCT/JP2018/028557, mailed on Sep. 25, 2018.

JP Office Action for JP Application No. 2023-015841, mailed on Dec. 5, 2023 with English Translation.

JP Office Action for JP Application No. 2024-112283, mailed on May 7, 2025 with English Translation.

JP Office Action for JP Application No. 2024-112283, mailed on Sep. 30, 2025 with English Translation.

* cited by examiner

EVALUATION APPARATUS, EVALUATION METHOD, AND NON-TRANSITORY STORAGE MEDIUM

CROSS-REFERENCE TO RELATED APPLICATIONS

The present application is a continuation application of U.S. patent application Ser. No. 17/713,638 filed on Apr. 5, 2022, which is a continuation application of U.S. patent application Ser. No. 17/262,964 filed on Jan. 25, 2021, which issued as U.S. Pat. No. 11,328,404, which is a National Stage Entry of international application PCT/JP2018/028557 filed on Jul. 31, 2018, the disclosures of all of which are incorporated in their entirety by reference herein.

TECHNICAL FIELD

The present invention relates to an evaluation apparatus, an obtaining apparatus, a surveillance method, a surveillance apparatus, an evaluation method, a computer program, and an obtaining method.

BACKGROUND ART

When surveillance is performed with images from a camera, the arrangement of cameras has an influence on the accuracy of the surveillance. That is, in order to surveil the target region as thoroughly as possible, it is necessary to arrange the cameras appropriately.

Patent Document 1 discloses a surveillance apparatus that processes an image obtained by a camera to track an object.

Patent Document 2 discloses a technique of obtaining a camera arrangement for facilitating image processing for surveillance.

Patent Document 3 discloses that an orientation evaluation, an obstruction evaluation, and an image quality evaluation are performed for a plurality of image capturing apparatuses that capture an image of a surveillance target, and the representative image capturing apparatus is determined.

Patent Document 4 discloses that the next action of an intruder is predicted based on the trajectory information of the intruder, and the importance is ranked based on a plurality of camera images, or the orientation and the like of a surveillance camera is controlled in accordance with the computed movement direction of the intruder.

Patent Document 5 discloses an evaluation apparatus that evaluates the arrangement position of a surveillance camera using a non-diffraction Voronoi diagram.

Patent Document 6 discloses a technique of selecting a camera to be used for display in a method of switching a plurality of cameras and displaying an image.

RELATED DOCUMENTS

Patent Documents

[Patent Document 1] Japanese Patent Application Publication No. H7-49952

[Patent Document 2] International Publication No. WO 2014/002398

[Patent Document 3] Japanese Patent Application Publication No. 2016-127571

[Patent Document 4] Japanese Patent Application Publication No. 2014-36414

[Patent Document 5] Japanese Patent Application Publication No. 2011-86995

[Patent Document 6] Japanese Patent Application Publication No. 2017-139725

SUMMARY OF THE INVENTION

Technical Problem

However, in the techniques in Patent Documents 1 to 6, it is not possible to realize a surveillance apparatus with decreased frequency of overlooking. For example, Patent Document 1 does not disclose the camera arrangement suitable for surveilling an object. The technique in Patent Document 2 is a technique for intending to obtain an image suitable for image processing, and thus it is difficult to perform the evaluation and the optimization for clearly capturing the entire target region. The techniques in Patent Documents 3 and 6 are techniques of selecting the best image from the obtained images, and it is not possible to evaluate the arrangement of the image capturing apparatus in consideration of other factors than the arrangement of the image capturing apparatus already provided. The technique in Patent Document 4 is a technique of focusing on and tracking a specific object, and it is not possible to reduce the blind spot in the entire target region. In the technique in Patent Document 5, it is difficult to perform the evaluation in consideration of conditions other than the target region and the shape of an obstacle.

The present invention has been made in view of the above problems. An object of the present invention is to provide a technique capable of realizing surveillance in which overlooking occurs less frequently.

Solution to Problem

According to the present invention, an evaluation apparatus evaluates an arrangement of one or more image capturing apparatuses that surveil a target region. The evaluation apparatus includes an acquisition unit that acquires arrangement information and environmental information, the arrangement information indicating at least any of a position of the image capturing apparatus, an orientation of the image capturing apparatus, and a field angle of the image capturing apparatus, and the environmental information indicating an environment of the target region, an index computation unit that computes, for each of a plurality of positions in the target region, a surveillance index by using the arrangement information and the environmental information, the surveillance index indicating difficulty or easiness of surveilling a target object in a case where the target object is located at the position, and a suitability computation unit that computes suitability of the arrangement of the image capturing apparatus, which is indicated by the arrangement information, based on distribution of the surveillance index in the target region.

According to the present invention, an obtaining apparatus obtains an arrangement of one or more image capturing apparatuses that surveil a target region. The obtaining apparatus includes an acquisition unit that acquires condition information indicating a condition regarding the arrangement of the image capturing apparatus and environmental information indicating an environment of the target region, an arrangement information generation unit that generates a plurality of pieces of arrangement information based on the condition information and the environmental information, the arrangement information indicating at least any of a position of the image capturing apparatus, an orientation of the image capturing apparatus, and a field angle of the image capturing apparatus, an evaluation unit that evaluates each of the arrangements of the image capturing apparatus, which are indicated by the plurality of pieces of arrangement information, and a selection unit that selects one or more pieces of the arrangement information from among the plurality of pieces of arrangement information, based on an evaluation result of the evaluation unit. The evaluation unit includes an index computation unit that computes, for each of a plurality of positions in the target region, a surveillance index by using the arrangement information and the environmental information, the surveillance index indicating difficulty or easiness of surveilling a target object in a case where the target object is located at the position, and a suitability computation unit that computes suitability of the arrangement of the image capturing apparatus, which is indicated by the arrangement information, based on distribution of the surveillance index in the target region.

According to the present invention, a first surveillance apparatus surveils a target region with one or more image capturing apparatuses. The first surveillance apparatus includes an obtaining unit that obtains an arrangement of the image capturing apparatus, and an arrangement control unit that controls the arrangement of the image capturing apparatus based on the arrangement of the image capturing apparatus obtained by the obtaining unit. The obtaining unit includes an acquisition unit that acquires condition information indicating a condition regarding the arrangement of the image capturing apparatus and environmental information indicating an environment of the target region, an arrangement information generation unit that generates a plurality of pieces of arrangement information based on the condition information and the environmental information, the arrangement information indicating at least any of a position of the image capturing apparatus, an orientation of the image capturing apparatus, and a field angle of the image capturing apparatus, an evaluation unit that evaluates each of the arrangements of the image capturing apparatus, which are indicated by the plurality of pieces of arrangement information, and a selection unit that selects one or more pieces of the arrangement information from among the plurality of pieces of arrangement information, based on an evaluation result of the evaluation unit. The evaluation unit includes an index computation unit that computes, for each of a plurality of positions in the target region, a surveillance index by using the arrangement information and the environmental information, the surveillance index indicating difficulty or easiness of surveilling a target object in a case where the target object is located at the position, and a suitability computation unit that computes suitability of the arrangement of the image capturing apparatus, which is indicated by the arrangement information, based on distribution of the surveillance index in the target region.

According to the present invention, there is provided an evaluation method of evaluating an arrangement of one or more image capturing apparatuses that surveil a target region. The evaluation method includes an acquisition step of acquiring arrangement information and environmental information, the arrangement information indicating at least any of a position of the image capturing apparatus, an orientation of the image capturing apparatus, and a field angle of the image capturing apparatus, and the environmental information indicating an environment of the target region, an index computation step of computing, for each of a plurality of positions in the target region, a surveillance index by using the arrangement information and the environmental information, the surveillance index indicating difficulty or easiness of surveilling a target object in a case where the target object is located at the position, and a suitability computation step of computing suitability of the arrangement of the image capturing apparatus, which is indicated by the arrangement information, based on distribution of the surveillance index in the target region.

According to the present invention, there is provided a first computer program for realizing an evaluation apparatus that evaluates an arrangement of one or more image capturing apparatuses that surveil a target region. The first computer program causes a computer to function as an acquisition unit that acquires arrangement information and environmental information, the arrangement information indicating at least any of a position of the image capturing apparatus, an orientation of the image capturing apparatus, and a field angle of the image capturing apparatus, and the environmental information indicating an environment of the target region, an index computation unit that computes, for each of a plurality of positions in the target region, a surveillance index by using the arrangement information and the environmental information, the surveillance index indicating difficulty or easiness of surveilling a target object in a case where the target object is located at the position, and a suitability computation unit that computes suitability of the arrangement of the image capturing apparatus, which is indicated by the arrangement information, based on distribution of the surveillance index in the target region.

According to the present invention, there is provided an obtaining method of obtaining an arrangement of one or more image capturing apparatuses that surveil a target region. The obtaining method includes an acquisition step of acquiring condition information indicating a condition regarding the arrangement of the image capturing apparatus and environmental information indicating an environment of the target region, an arrangement information generation step of generating a plurality of pieces of arrangement information based on the condition information and the environmental information, the arrangement information indicating at least any of a position of the image capturing apparatus, an orientation of the image capturing apparatus, and a field angle of the image capturing apparatus, an evaluation step of evaluating each of the arrangements of the image capturing apparatus, which are indicated by the plurality of pieces of arrangement information, and a selection step of selecting one or more pieces of the arrangement information from the plurality of pieces of arrangement information, based on an evaluation result in the evaluation step. The evaluation step includes an index computation step of computing, for each of a plurality of positions in the target region, a surveillance index by using the arrangement information and the environmental information, the surveillance index indicating difficulty or easiness of surveilling a target object in a case where the target object is located at the position, and a suitability computation step of computing suitability of the arrangement of the image capturing apparatus, which is indicated by the arrangement information, based on distribution of the surveillance index in the target region.

According to the present invention, there is provided a second computer program for realizing an obtaining apparatus that obtains an arrangement of one or more image capturing apparatuses that surveil a target region. The second computer program causes a computer to function as an acquisition unit that acquires condition information indicating a condition regarding the arrangement of the image capturing apparatus and environmental information indicating an environment of the target region, an arrangement information generation unit that generates a plurality of pieces of arrangement information based on the condition information and the environmental information, the arrangement information indicating at least any of a position of the image capturing apparatus, an orientation of the image capturing apparatus, and a field angle of the image capturing apparatus, an evaluation unit that evaluates each of the arrangements of the image capturing apparatus, which are indicated by the plurality of pieces of arrangement information, and a selection unit that selects one or more pieces of the arrangement information from among the plurality of pieces of arrangement information, based on an evaluation result of the evaluation unit. The evaluation unit includes an index computation unit that computes, for each of a plurality of positions in the target region, a surveillance index by using the arrangement information and the environmental information, the surveillance index indicating difficulty or easiness of surveilling a target object in a case where the target object is located at the position, and a suitability computation unit that computes suitability of the arrangement of the image capturing apparatus, which is indicated by the arrangement information, based on distribution of the surveillance index in the target region.

According to the present invention, there is provided a surveillance method of surveilling a target region with one or more image capturing apparatuses. The surveillance method includes an obtaining step of obtaining an arrangement of the image capturing apparatus, and an arrangement control step of controlling the arrangement of the image capturing apparatus based on the arrangement of the image capturing apparatus obtained in the obtaining step. The obtaining step includes an acquisition step of acquiring condition information indicating a condition regarding the arrangement of the image capturing apparatus and environmental information indicating an environment of the target region, an arrangement information generation step of generating a plurality of pieces of arrangement information based on the condition information and the environmental information, the arrangement information indicating at least any of a position of the image capturing apparatus, an orientation of the image capturing apparatus, and a field angle of the image capturing apparatus, an evaluation step of evaluating each of the arrangements of the image capturing apparatus, which are indicated by the plurality of pieces of arrangement information, and a selection step of selecting one or more pieces of the arrangement information from among the plurality of pieces of arrangement information, based on an evaluation result in the evaluation step. The evaluation step includes an index computation step of computing, for each of a plurality of positions in the target region, a surveillance index by using the arrangement information and the environmental information, the surveillance index indicating difficulty or easiness of surveilling a target object in a case where the target object is located at the position, and a suitability computation step of computing suitability of the arrangement of the image capturing apparatus, which is indicated by the arrangement information, based on distribution of the surveillance index in the target region.

According to the present invention, there is provided a third computer program for realizing a surveillance apparatus that surveils a target region with one or more image capturing apparatuses. The third computer program causes a computer to function as an obtaining unit that obtains an arrangement of the image capturing apparatus, and an arrangement control unit that controls the arrangement of the image capturing apparatus based on the arrangement of the image capturing apparatus obtained by the obtaining unit. The obtaining unit includes an acquisition unit that acquires condition information indicating a condition regarding the arrangement of the image capturing apparatus and environmental information indicating an environment of the target region, an arrangement information generation unit that generates a plurality of pieces of arrangement information based on the condition information and the environmental information, the arrangement information indicating at least any of a position of the image capturing apparatus, an orientation of the image capturing apparatus, and a field angle of the image capturing apparatus, an evaluation unit that evaluates each of the arrangements of the image capturing apparatus, which are indicated by the plurality of pieces of arrangement information, and a selection unit that selects one or more pieces of the arrangement information from among the plurality of pieces of arrangement information, based on an evaluation result of the evaluation unit. The evaluation unit includes an index computation unit that computes, for each of a plurality of positions in the target region, a surveillance index by using the arrangement information and the environmental information, the surveillance index indicating difficulty or easiness of surveilling a target object in a case where the target object is located at the position, and a suitability computation unit that computes suitability of the arrangement of the image capturing apparatus, which is indicated by the arrangement information, based on distribution of the surveillance index in the target region.

According to the present invention, a second surveillance apparatus surveils a target region with one or more image capturing apparatuses. The second surveillance apparatus includes at least one of an analysis unit that analyzes an image captured by the image capturing apparatus and a display unit that displays the image. The image capturing apparatus is placed based on arrangement information obtained based on distribution of a surveillance index in the target region. The surveillance index is computed based on environmental information indicating an environment of the target region for each of a plurality of positions in the target region, and indicates difficulty or easiness of surveillance of a target object in a case where the target object is located at the position. The arrangement information indicates at least any of a position of the image capturing apparatus, an orientation of the image capturing apparatus, and a field angle of the image capturing apparatus.

Advantageous Effects of Invention

According to the present invention, it is possible to provide a technique capable of realizing surveillance in which overlooking occurs less frequently.

BRIEF DESCRIPTION OF THE DRAWINGS

The above-described object, other objects, features, and advantages will be further clarified by the preferred example embodiments described below and the accompanying drawings.

DESCRIPTION OF EMBODIMENTS

Hereinafter, example embodiments of the present invention will be described with reference to the drawings. In all the drawings, the similar constituents are denoted by the similar reference signs, and description thereof will not be repeated.

First Example Embodiment

Figure 1:
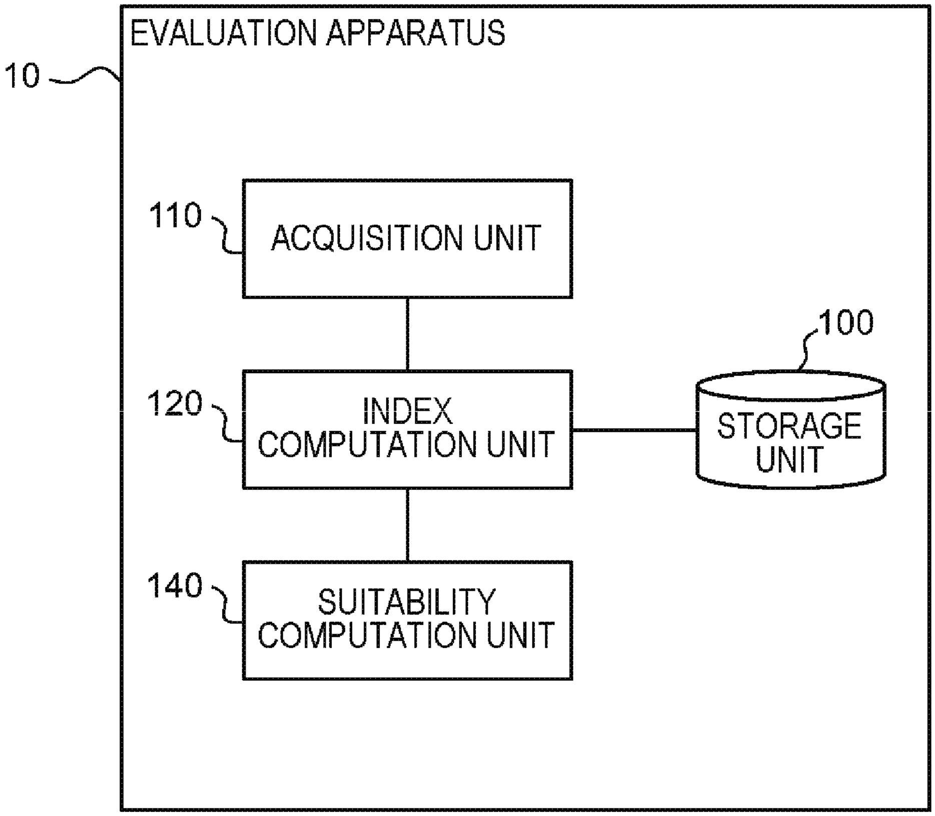
FIG. 1 is a block diagram illustrating a configuration of an evaluation apparatus according to a first example embodiment.
Figure 2:
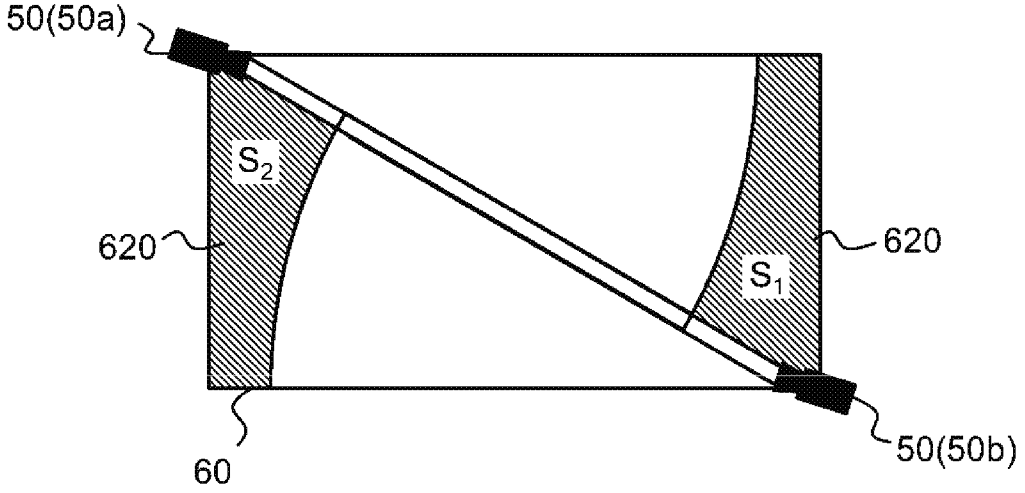
FIG. 2 is a diagram illustrating an evaluation method according to the first example embodiment.

FIG. 1 is a block diagram illustrating a configuration of an evaluation apparatus 10 according to a first example embodiment. In addition, FIG. 2 is a diagram illustrating an evaluation method according to the first example embodiment. The evaluation apparatus 10 according to the present example embodiment evaluates the arrangement of one or more image capturing apparatuses 50 that surveil a target region 60. The evaluation apparatus 10 includes an acquisition unit 110, an index computation unit 120, and a suitability computation unit 140. The acquisition unit 110 acquires arrangement information and environmental information. The arrangement information indicates at least any of the position of the image capturing apparatus 50, the orientation of the image capturing apparatus 50, and the field angle of the image capturing apparatus 50. The environmental information indicates the environment of the target region 60. The index computation unit 120 computes, for each of a plurality of positions $p_i$ in the target region 60, a surveillance index by using the arrangement information and the environmental information, the surveillance index indicating difficulty or easiness of surveilling a target object in a case where the target object is located at each of the plurality of positions $p_i$. The suitability computation unit 140 computes the suitability of the arrangement of the image capturing apparatus 50 indicated by the arrangement information, based on the distribution of the surveillance index in the target region 60. This will be described in detail below.

The target region 60 is a region to be surveilled. The target region 60 may be indoors or outdoors. The target region 60 may be a region surrounded by a wall, a door, or the like. A portion of a region wider than the target region 60 may be freely defined as the target region 60.

The target region 60 is surveilled by one or more image capturing apparatuses 50. The target region 60 may be surveilled by one image capturing apparatus 50, but is preferably surveilled by a plurality of image capturing apparatuses 50. The image capturing apparatus 50 is arranged to enable capturing of an image of at least a portion of the target region 60. The image captured by the image capturing apparatus 50 may be a still image or may form a moving image. The image capturing apparatus 50 is, for example, a security camera or a video camera. The image capturing apparatus 50 may be an analog camera or a network camera (IP camera). The image capturing apparatus 50 may be a visible light camera, or may be a camera such as an infrared camera that detects light other than the visible light.

The evaluation apparatus 10 according to the present example embodiment evaluates the arrangement of the image capturing apparatus 50 in the target region 60. That is, the evaluation apparatus 10 evaluates an image capturing region of the image capturing apparatus 50. The image capturing region of the image capturing apparatus 50 is defined by the arrangement of the image capturing apparatus 50. The arrangement of the image capturing apparatus 50 includes the position of the image capturing apparatus 50, the orientation of the image capturing apparatus 50, and the field angle of the image capturing apparatus 50. The evaluation apparatus 10 can evaluate the position of the image capturing apparatus 50, the orientation of the image capturing apparatus 50, and the field angle of the image capturing apparatus 50, as the arrangement of the image capturing apparatus 50. That is, it is possible to compute the suitability for the combination of the position, orientation, and the field angle of the image capturing apparatus 50.

When the target region 60 is surveilled by a plurality of image capturing apparatuses 50, the evaluation apparatus 10 computes the evaluation result for the combination of the arrangement of the plurality of image capturing apparatuses 50, that is, computes the suitability for surveillance.

On the other hand, some of the position of the image capturing apparatus 50, the orientation of the image capturing apparatus 50, and the field angle of the image capturing apparatus 50 may be predetermined, and the evaluation apparatus 10 may evaluate the remaining of the position of the image capturing apparatus 50, the orientation of the image capturing apparatus 50, and the field angle of the image capturing apparatus 50. For example, the position and the field angle of the image capturing apparatus 50 may have already been defined, and the evaluation apparatus 10 may evaluate only the orientation of the image capturing apparatus 50. That is, the evaluation apparatus 10 may compute the suitability of the orientation of the image capturing apparatus 50 on the premise of the position and the field angle of the image capturing apparatus 50, which have been predetermined.

The acquisition unit 110 acquires the arrangement information and the environmental information from the outside of the evaluation apparatus 10 or in the evaluation apparatus 10. For example, a user may perform an input operation on the evaluation apparatus 10, and the acquisition unit 110 may acquire the arrangement information and the environmental information based on the input contents of the user. The acquisition unit 110 may acquire the environmental information from a detection unit such as a sensor or a camera. Further, the arrangement information and the environmental information may be stored in advance in the storage unit 100 provided outside or inside the evaluation apparatus 10, and the acquisition unit 110 may read and acquire the arrangement information and the environmental information. The storage unit 100 refers to any storage device. FIG. 1 illustrates an example in which the evaluation apparatus 10 includes the storage unit 100.

As described above, the arrangement information indicates at least any of the position of the image capturing apparatus 50, the orientation of the image capturing apparatus 50, and the field angle of the image capturing apparatus 50. The position of the image capturing apparatus 50 is represented by, for example, the spatial coordinates of the image capturing apparatus 50, that is, the planar position coordinates and the height. The coordinate space may be a coordinate system relative to the target region 60, or may be a real world coordinate system defined with a certain point in the real space as the origin. The orientation of the image capturing apparatus 50 is, that is, the pose of the image capturing apparatus 50, and is represented by, for example, a vector in the coordinate space. The orientation of the image capturing apparatus 50 may be represented by a combination of an elevation angle or a depression angle with a rotation angle in a horizontal direction. In a case where the image capturing apparatus 50 is attached to a drive apparatus capable of changing the orientation of the image capturing apparatus 50, the orientation of the image capturing apparatus 50 may be represented by a control parameter of the drive apparatus. The field angle of the image capturing apparatus 50 is represented by, for example, a combination of a horizontal angle and a vertical angle, or by a diagonal angle. Further, the field angle of the image capturing apparatus 50 may be represented by a camera parameter representing, for example, the degree of zoom of the image capturing apparatus 50.

In a case where the target region 60 is surveilled by a plurality of image capturing apparatuses 50, the arrangement information includes information regarding all the image capturing apparatuses 50. It should be noted that, the acquisition unit 110 may acquire some pieces of the arrangement information by a method different from a method for acquiring other pieces of the arrangement information. For example, some pieces of the arrangement information may be stored in the storage unit 100 in advance, and the other pieces may be input by the user.

The environmental information indicates at least any of the shape of the target region 60, the size of the target region 60, the position of an object 660 (for example, illustrated in FIG. 11) placed in the target region 60, the shape of the object 660, the size of the object 660, and the orientation of the object 660. Preferably, the environmental information includes at least information indicating the shape of the target region 60 and the size of the target region 60 among the above-described items. The environmental information may further include information indicating the type of the target region or the type of at least a portion of the target region. The type of target region or the type of at least the portion of the target region is, for example, indoors, an elongated passage, or outdoors. The information indicating the shape of the target region 60 and the size of the target region 60 is, for example, drawing information. Further, the environmental information may be three-dimensional model data indicating the target region 60 and the object 660.

The object 660 placed in the target region 60 is a so-called obstacle in surveillance. For example, the object 660 is a pillar, a wall, a window, an appliance, a lighting (for example, hanging from a ceiling), an advertisement, a display, a guide plate, or the like. Information indicating the position of the object 660 is represented by spatial coordinates. The coordinate space may be a coordinate system relative to the target region 60, or may be a real world coordinate system. Information indicating the shape of the object 660, the size of the object 660, and the orientation of the object 660 is, for example, drawing information. A plurality of objects 660 may be arranged in the target region 60. The environmental information may further include information indicating the type of product arranged on the appliance in a case where the target region 60 is the sales floor of a store. Further, in a case where a staircase, a slope, a step, or the like is in the target region 60, the environmental information may further include information indicating the length, the height, and the incline thereof.

In a case where a lighting exists as the object 660, the environmental information may include information indicating the distribution of the illuminance of the lighting. The environmental information may further include information indicating the irradiation direction of sunlight.

The arrangement information is associated with the environmental information. Thus, the arrangement of the image capturing apparatus 50 for the target region 60 is indicated by the arrangement information and the environmental information. It should be noted that, the image capturing apparatus 50 is not necessarily required to be arranged in the target region 60 as long as the image capturing apparatus 50 is capable of capturing an image of at least a portion of the target region 60.

In a case where the user performs an input operation on the evaluation apparatus 10 and the acquisition unit 110 acquires the environmental information based on the input contents of the user, for example, the user may use an input unit such as a touch panel on a screen of a display device to set the target region 60, and may input conditions for the disposition of the object 660 or the like, a lighting, or sunlight. In a case where the user performs an input operation on the evaluation apparatus 10 and the acquisition unit 110 acquires the arrangement information based on the input contents of the user, for example, the image capturing apparatus 50 may be arranged on the screen showing the target region 60 by using the input unit such as the touch panel, and the orientation and the field angle may be input for the image capturing apparatus 50.

As described above, the index computation unit 120 computes the surveillance index for each of a plurality of positions $p_i$ in the target region 60. The surveillance index may have a value that increases as it is more difficult to surveil a target object 70, for example, in a case where the target object 70 is located at the position $p_i$ (for example, illustrated in FIG. 4(*a*)). Alternatively, the surveillance index may have a value that increases as it is easier to surveil a target object 70 when the target object 70 is located at the position $p_i$. The index computation unit 120 determines the easiness or the difficulty of surveillance based on the arrangement information and the environmental information, and applies the determination result to the surveillance index. The target object 70 is, for example, a person or a vehicle.

The surveillance index indicates the difficulty or the easiness of surveilling the target object 70 using an image obtained by the image capturing apparatus 50. It should be noted that, in a case where the target region 60 is surveilled by a plurality of image capturing apparatuses 50, the surveillance index at each position $p_i$ is obtained in consideration of the influences of all the image capturing apparatuses 50.

The viewing difficulty or viewing easiness of the target object 70 in an image in a case where a surveillant visually checks the image captured by the image capturing apparatus 50 has been applied to the surveillance index. For example, in a case where the target object 70 in the image is small, the lighting condition is as poor as it is not possible to clearly see the target object, or a portion or the entirety of the target object 70 is not captured in the image, it is difficult to visually recognize the target object 70 and to surveil the target object 70.

The appropriateness for image processing in a case where some processing are performed on an image captured by the image capturing apparatus 50 to perform surveillance is applied to the surveillance index. The processing on the image is, for example, at least any of detection, matching, tracking, and abnormality detection of the target object 70. For example, in a case where the resolution of the portion corresponding to the target object 70 in the image is low, the depression angle (gazing point angle) from the image capturing apparatus 50 to the target object 70 is large, or the portion or the entirety of the target object 70 is not captured in the image, the appropriateness for the processing is low and it is difficult to perform the surveillance. A method of computing the surveillance index will be described in detail later.

It should be noted that, an example in which the index computation unit 120 computes and uses a surveillance-unsuitability index indicating the difficulty of surveilling a target object will be described below. However, the present example embodiment is not limited to this example, the index computation unit 120 may compute and use a surveillance suitability index indicating the easiness of surveilling the target object 70. The surveillance-unsuitability index for the position $p_i$ at which it is more difficult to surveil the target object 70 has a larger value. The magnitude of the surveillance suitability index is opposite to the magnitude of the surveillance-unsuitability index. The surveillance suitability index and the surveillance-unsuitability index can have values which are equal to or more than 0 and equal to or less than 1, for example.

The suitability computation unit 140 acquires the surveillance index from the index computation unit 120, and computes the suitability of the arrangement of the image capturing apparatus 50 in the target region 60. As the suitability increases, overlooking of the target object 70 in surveillance of the target region 60 due to the arrangement of the image capturing apparatus 50 occurs less frequently. Specifically, the suitability computation unit 140 evaluates whether the positions $p_i$ at which the surveillance-unsuitability index is high are not distributed together. In a case where a plurality of positions $p_i$ at which the surveillance-unsuitability index is high, that is, a plurality of positions $p_i$ at which surveillance has difficulty are densely provided, the plurality of positions $p_i$ form a surveillance-unsuitable region 620 in which surveillance has difficulty. This is because, when the target object 70 enters the surveillance-unsuitable region, it takes a long time to pass through the region, and the target object 70 is easily lost. The suitability computation unit 140 computes a lower suitability for the arrangement of the image capturing apparatus 50 as the size of the surveillance-unsuitable region 620 formed by the positions $p_i$ at which the surveillance-unsuitability index is high and which are densely provided becomes larger. A method of computing the suitability will be described in detail later.

The suitability computed by the suitability computation unit 140 is displayed by a display unit such as a display. The suitability may be stored in the storage unit 100, or may be input to a device outside the evaluation apparatus 10.

As described above, the evaluation apparatus 10 in the present example embodiment computes the surveillance index for each position $p_i$ in the target region 60, and obtains the suitability of the arrangement of the image capturing apparatus 50 from the distribution of the surveillance index in the target region 60. With such a method, it is possible to evaluate the quality of the arrangement of the image capturing apparatus 50 for the entirety of the target region 60. As a result, it is possible to reduce the blind spot and a place in which it is difficult to recognize the target object 70 from an image, as much as possible, and to obtain the arrangement of the image capturing apparatus 50 in which overlooking of the target object 70 occurs less frequently in the target region 60.

For example, the user of the evaluation apparatus 10 can evaluate a plurality of arrangement candidates with the evaluation apparatus 10 and adopt the arrangement having the best evaluation result obtained.

Figure 3:
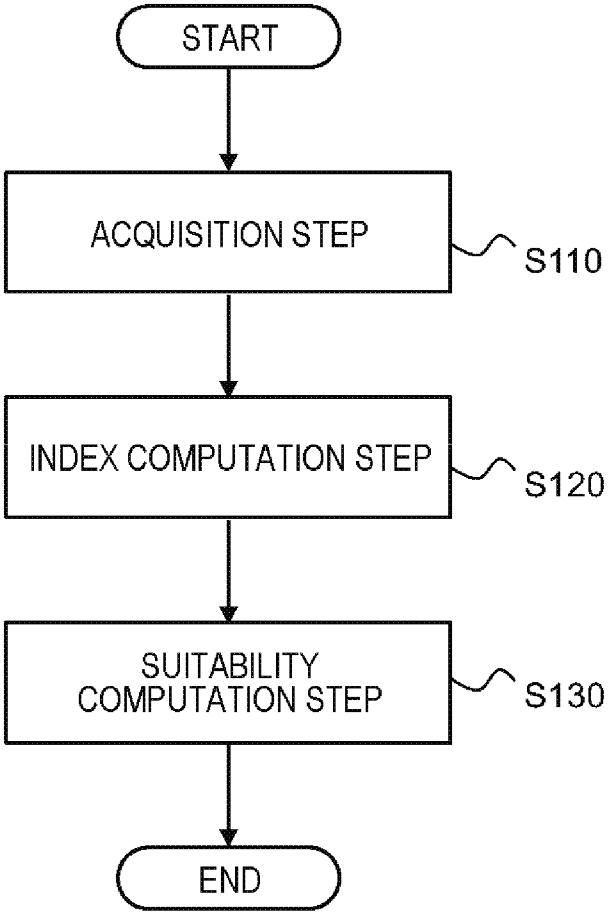
FIG. 3 is a flowchart illustrating the evaluation method according to the first example embodiment.

FIG. 3 is a flowchart illustrating an evaluation method according to the first example embodiment. The evaluation method in the present example embodiment is a method of evaluating the arrangement of one or more image capturing apparatuses 50 that surveil the target region 60. The present evaluation method includes an acquisition step S110, an index computation step S120, and a suitability computation step S130. In the acquisition step S110, the arrangement information including at least any of the position of the image capturing apparatus 50, the orientation of the image capturing apparatus 50, and the field angle of the image capturing apparatus 50, and the environmental information indicating the environment of the target region 60 are acquired. In the index computation step S120, for each of a plurality of positions $p_i$ in the target region 60, the surveillance index indicating difficulty or easiness of surveilling the target object 70 in a case where the target object 70 is located at the position $p_i$ is computed using the arrangement information and the environmental information. In the suitability computation step S130, the suitability of the arrangement of the image capturing apparatus 50 indicated by the arrangement information is computed based on the distribution of the surveillance index in the target region 60.

The evaluation method according to the present example embodiment is realized by the evaluation apparatus 10 according to the present example embodiment.

<Method of Computing Surveillance Index>

The method in which the index computation unit 120 computes the surveillance index in the index computation step S120 will be described below. For example, the target region 60 is partitioned into a plurality of positions $p_i$. In a case where the target objects 70 are respectively located at a plurality of positions $p_i$ in the target region 60, the index computation unit 120 computes the surveillance index based on at least any of the size, the brightness, the hiding degree of the target object 70 captured by the image capturing apparatus 50.

Figure 4A:
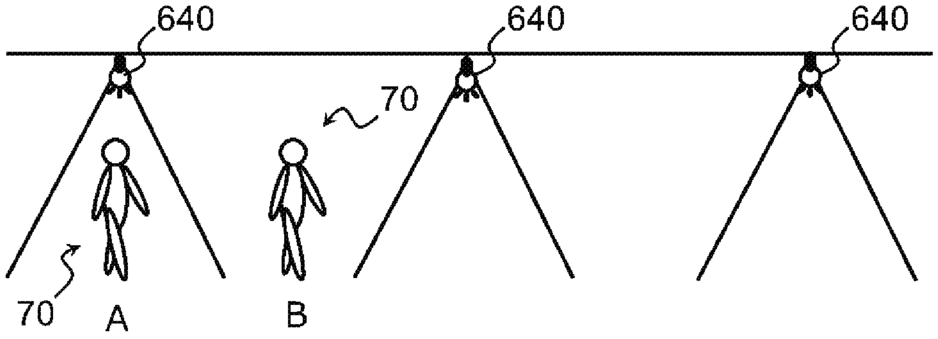
FIGS. 4(*a*) and 4(*b*) are diagrams illustrating an example in which an index computation unit computes a surveillance index based on brightness of a target object captured by an image capturing apparatus.
Figure 4B:
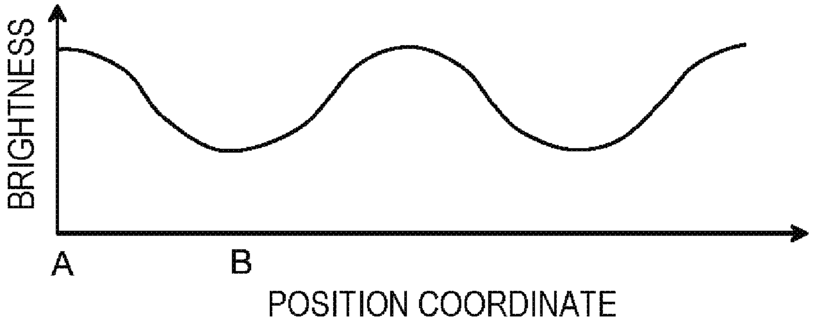

FIGS. 4(*a*) and 4(*b*) are diagrams illustrating an example in which the index computation unit 120 computes the surveillance index based on the brightness of the target object 70 captured by the image capturing apparatus 50. In the example of FIGS. 4(*a*) and 4(*b*), the environmental information indicates that a plurality of lightings 640 are installed on the ceiling. The environmental information includes information indicating the distribution of the illuminance of each lighting 640. For example, as illustrated in FIG. 4(*b*), the distribution of the brightness at each position $p_i$ is obtained. In the example of FIGS. 4(*a*) and 4(*b*), a position A is brighter than a position B. Here, the brightness refers to the luminance of the portion corresponding to the target object 70 in an image when the image of the target object 70 is captured by the image capturing apparatus 50. For example, information indicating the relation between the illuminance and the luminance is stored in the storage unit 100 in advance, and the index computation unit 120 can read the information and use the information for computing the brightness based on the illuminance. The information indicating the relation between the illuminance and the luminance may be in a form of a mathematical expression, a graph, a table, or the like.

The distribution of the luminance may be computed using, for example, information regarding the characteristics of the lighting. The information regarding the characteristics of the lighting includes information indicating the intensity of light of the lighting or the degree of diffusion of the light, for each type of lighting (for example, type, size, model number, and the like of an LED or a fluorescent lamp), and is stored in the storage unit 100 in advance. It is possible to obtain the distribution of the luminance of each lighting based on the information regarding the characteristics of the lighting. In addition, the environmental information includes information indicating the position and the type of the lighting placed in the target region 60. It is possible to compute the distribution of the total luminance by superimposing the distribution of the luminance of the individual lighting on the assumption that the lighting is placed in accordance with the environmental information.

Figure 5:
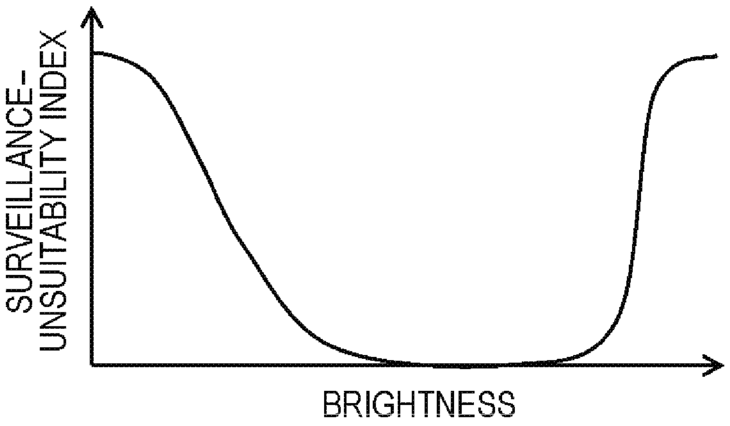
FIG. 5 is a graph illustrating a relation between the brightness and a surveillance-unsuitability index.

FIG. 5 is a graph illustrating the relation between the brightness and the surveillance-unsuitability index. The storage unit 100 further stores information indicating the relation between the brightness and the surveillance index in advance, and the index computation unit 120 can obtain the surveillance index based on the information and the brightness. The information indicating the relation between the brightness and the surveillance index may be in a form of a mathematical expression, a graph, a table, or the like. It is possible to obtain the information indicating the relation between the brightness and the surveillance index, by examining the relation between the brightness, and the easiness of visually recognizing the target object 70 in the image and the accuracy of image processing, in advance.

In a case where the brightness is not sufficient, the visibility of the target object 70 in a case where the image is visually observed is decreased. In addition, adverse effects such as a decrease in the detection rate of the target object 70 by image processing occur. On the other hand, in a case where the target object 70 is too bright, the original color, the original pattern, and the like of the target object 70 will be overexposed in the image. Therefore, it is difficult to surveil the target object 70 in any case, and the surveillance-unsuitability index is higher than in other cases.

The index computation unit 120 may further obtain the brightness or the surveillance index in consideration of the sunshine condition. For example, in a case where the target region 60 is outdoors, the index computation unit 120 can estimate the influence of sunlight from the position of the object 660 or the irradiation direction of sunlight, which are included in the environmental information, and apply the estimated influence to the brightness or the surveillance index. For example, in a case where the image capturing apparatus 50 faces in a direction from which the sunlight comes, the target object 70 is darkened by the backlight. Therefore, it is difficult to surveil the target object 70, and the surveillance-unsuitability index is higher than in a case where the image capturing apparatus 50 does not face in the direction from which the sunlight comes. Even in a case where the image capturing apparatus 50 does not face in the direction from which the sunlight comes and the target object 70 is directly exposed to the sunlight, the target object 70 becomes too bright. Therefore, it is difficult to surveil the target object 70, and the surveillance-unsuitability index is higher than in a case where the image capturing apparatus 50 does not face in the direction from which the sunlight comes. On the other hand, in a case where the sunlight is blocked by a wall or the like and thus the target object 70 is not directly exposed to the sunlight, the brightness of the target object 70 is maintained at an appropriate value. Therefore, it is easy to surveil the target object 70, and the surveillance-unsuitability index is low.

Even in a case where the target region 60 is indoors, the sunshine condition can be obtained from the position of a window and the irradiation direction of sunlight, which are included in the environmental information. Therefore, similar to the case where the target region is outdoors, it is possible to apply the influence of the sunlight to the brightness or the surveillance index.

Next, a method in which the index computation unit 120 computes the surveillance index based on the size of the target object 70 captured by the image capturing apparatus 50 will be described. For example, the index computation unit 120 estimates that, as the distance from the image capturing apparatus 50 to a target position becomes longer, the target object 70 in the image captured by the image capturing apparatus 50 is reduced, and sets the surveillance-unsuitability index at the target position to be high. The target position refers to the position $p_i$ at which computation of the surveillance index is intended. In a case where the target position is too close to the image capturing apparatus 50, it is estimated that the target object 70 protrudes from the field of view of the image capturing apparatus 50, so that the degree of hiding of the target object 70 increases and the surveillance-unsuitability index increases as described later. The index computation unit 120 computes the distance between the image capturing apparatus 50 and the target position based on the arrangement information and the environmental information. Then, for example, information indicating the relation between the distance from the image capturing apparatus 50 and the surveillance index is stored in advance in the storage unit 100, and the index computation unit 120 can read and use the information for computing the surveillance index. The information indicating the relation between the distance and the surveillance index may be in a form of a mathematical expression, a graph, a table, or the like.

The size of the target object 70 in the image also changes depending on the zoom ratio of the image capturing apparatus 50. Thus, the information indicating the relation between the distance and the surveillance index may be prepared for each parameter representing the zoom ratio. In this case, the index computation unit 120 may select and use the information indicating the relation between the distance and the surveillance index, based on the zoom ratio indicated by the arrangement information.

The index computation unit 120 may generate an image captured by the image capturing apparatus 50 in a case where the evaluation apparatus 10 is placed at the target position, by simulation. Then, the index computation unit may compute the area (number of pixels) of a portion corresponding to the target object 70 in the image or the area of a rectangle surrounding the target object 70. In this manner, the index computation unit may obtain the surveillance index. As the area becomes larger, the target object 70 in the image becomes larger. For example, information indicating the relation between the area and the surveillance index is stored in advance in the storage unit 100, and the index computation unit 120 can read and use the information for computing the surveillance index. The information indicating the relation between the area and the surveillance index may be in a form of a mathematical expression, a graph, a table, or the like.

Next, the method in which the index computation unit 120 computes the surveillance index based on the degree of hiding of the target object 70 captured by the image capturing apparatus 50 will be described. Firstly, the index computation unit 120 sets the surveillance-unsuitability index at the position $p_i$ at which the image of the target object 70 is not captured by the image capturing apparatus 50, to a value higher than the surveillance-unsuitability index at the position $p_i$ at which the image of the target object 70 is captured by the image capturing apparatus 50. In a case where a plurality of positions $p_i$ at which the image of the target object 70 is not captured by the image capturing apparatus 50 are provided, the index computation unit 120 may set the surveillance-unsuitability index to increase as the position $p_i$ becomes farther from the image capturing region of the image capturing apparatus 50. When the target object 70 moves from the image capturing region of the image capturing apparatus 50 to the position $p_i$ outside the image capturing region of the image capturing apparatus 50, the elapsed time until the target object 70 reaches the position $p_i$ after the image of the target object has been captured finally in the image capturing region of the image capturing apparatus 50 becomes longer as the position $p_i$ becomes farther from the image capturing region of the image capturing apparatus 50. Therefore, the ambiguity of the position of the target object 70 becomes higher as the position $p_i$ becomes farther from the image capturing region.

Specifically, the index computation unit 120 uses the arrangement information and the environmental information to perform distance conversion on the image in which the image capturing region (field of view) of the image capturing apparatus 50 is drawn. Then, it is possible to obtain the shortest distance from the boundary between the outside and the inside of the image capturing region to the target position and to obtain the surveillance index of the target position. The index computation unit 120 may obtain the distance or the estimated time until the target object reaches the target position after the target object goes out of the image capturing region of the image capturing apparatus 50 by simulation, and define the surveillance index at the target position in accordance with the distance or the time.

On the other hand, the index computation unit 120 reduces the surveillance-unsuitability index as the ratio of a portion of the target object 70, which is captured by the image capturing apparatus 50, to the entirety of the target object 70 increases. Specifically, the index computation unit 120 generates an image captured by the image capturing apparatus 50 in a case where the target object 70 is placed at the target position by simulation. Then, the index computation unit obtains the ratio of a portion of the target object 70 that fits in the image. On the other hand, information indicating the relation between the ratio and the surveillance index is stored in advance in the storage unit 100. The index computation unit 120 computes the surveillance index using the obtained ratio and the information indicating the relation between the ratio and the surveillance index read from the storage unit 100. The information indicating the relation between the ratio and the surveillance index may be in a form of a mathematical expression, a graph, a table, or the like.

The index computation unit 120 may compute the surveillance index based on the gazing point angle at which the image of the target object 70 is captured. The gazing point angle is an angle formed by a straight line connecting the image capturing apparatus 50 and the gazing point in the target object 70 and a horizontal plane. The gazing point is a notable position of the target object 70, for example, the gravity center of the target object 70 or the midpoint of the axis of the gravity center. For example, it is estimated that, as the gazing point angle becomes larger, overlapping between the target object 70 and the object 660 is decreased. Therefore, the surveillance-unsuitability index may be set to decrease as the gazing point angle becomes larger.

In a case where object detection or object recognition is performed on an image, the surveillance-unsuitability index may be set to decrease as the gazing point angle approaches a specific angle at which it is easy to perform processing. Information indicating the relation between the gazing point angle and the surveillance index is stored in advance in the storage unit 100, and the index computation unit 120 can read and use the information for computing the surveillance index. The information indicating the relation between the gazing point angle and the surveillance index may be in a form of a mathematical expression, a graph, a table, or the like.

In a case where the target region 60 is surveilled by a plurality of image capturing apparatuses 50, the index computation unit 120 may perform, for example, processing as follows for the above-described individual factors (brightness, size, degree of hiding, gazing point angle, and the like) for determining the surveillance index. That is, the index computation unit 120 computes the surveillance index $V_m$ (m=1, 2, . . . , M, and M is a positive integer and indicates the number of image capturing apparatuses 50) for all image capturing apparatus 50 at each position $p_i$, as described above. In a case where the surveillance index is the surveillance-unsuitability index indicating the difficulty of surveillance, for example, the smallest surveillance index $V_m$ among the surveillance indices $V_m$ (m=1, 2, . . . , M) is set to a surveillance index VR as a representative value for a factor k. In a case where the surveillance index is the surveillance suitability index indicating the easiness of surveillance, the index computation unit 120 may set the largest surveillance index $V_m$ among the surveillance indices $V_m$ (m=1, 2, . . . , M) to the surveillance index $V_k$ as the representative value for the factor k. That is, the index computation unit can set the surveillance index $V_m$ indicating that the surveillance is performed the easiest among the surveillance indices $V_m$ (m=1, 2, . . . , M) to the surveillance index $V_k$ as the representative value for the factor k. Alternatively, the result of a simple average of the surveillance index $V_m$ or a weighted average thereof may be used as the surveillance index $V_k$. Here, only the surveillance index $V_m$ for the image capturing apparatus 50 that is capable of capturing the image of the target object 70 placed at the target position is used for the simple average or the weighted average of the surveillance index $V_m$. The method of obtaining the surveillance index $V_k$ from the surveillance index $V_m$ (m=1, 2, . . . M) can be defined for each factor.

As described above, there are a plurality of factors for which the surveillance index can be computed. Preferably, the final surveillance index is obtained comprehensively considering the factors. A method of obtaining the surveillance index V to which the plurality of factors are applied will be described below.

The surveillance index based on the factor k is set to $V_k$ (k=1, 2, . . . , K, and K is a positive integer and indicates the number of factors). In a case where the target region 60 is surveilled by a plurality of image capturing apparatuses 50, $V_k$ can be obtained as described above. In addition, in a case where the target region 60 is surveilled by one image capturing apparatus 50, the surveillance index obtained by the factor k for the image capturing apparatus 50 may be set to $V_k$. Then, a function such as V=F ($V_1$, . . . , $V_k$) can be defined to obtain the surveillance index V to which the plurality of factors are applied. For example, in a case where all $V_1$, . . . , and $V_k$ have values which is equal to or more than 0 and equal to or less than 1, V can be obtained by using a function such as Expression (1).

[Expression 1]

$$F(V_1, \ldots, V_K) = 1 - \prod_{k=1}^{K}(1 - V_k) \tag{1}$$

It should be noted that, even in a case where $V_k$ is not in a range which is equal to or more than 0 and equal to or less than 1, Expression (1) can be similarly applied by normalization within a range of values that can be taken by $V_k$.

Furthermore, the surveillance index may change depending on the time slot (time range). For example, in a store, the layout may be changed depending on the time slot to increase the number of cash registers. The lighting and sunlight conditions vary depending on the time. Therefore, the acquisition unit 110 may acquire the environmental information for each time slot, the index computation unit 120 may compute the surveillance index for each time slot, and the suitability computation unit 140 may use each result. At this time, validity information is associated with each of the environmental information, the surveillance index, and the suitability. The validity information indicates a time range in which the environmental information, the surveillance index, and the suitability are valid. The validity information may further include information indicating the ratio per unit time (such as one day or one week). The validity information is acquired by the acquisition unit 110 together with the environmental information, and is output from the index computation unit 120 and the suitability computation unit 140 together with the surveillance index and the suitability, respectively.

<Method of Computing Suitability>

Figure 6:
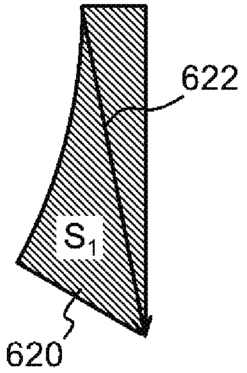
FIG. 6 is a diagram illustrating a method of computing suitability by a suitability computation unit.

FIG. 6 is a diagram illustrating the method of computing the suitability by the suitability computation unit 140. FIG. 6 illustrates one (region S1) of surveillance-unsuitable regions 620 in FIG. 2. In FIG. 6, an example of a route 622 in the surveillance-unsuitable region 620 is indicated by an arrow. A method in which the suitability computation unit 140 computes the suitability of the arrangement of the image capturing apparatus 50 in the suitability computation step S130 will be described below. The suitability computation unit 140 specifies one or more surveillance-unsuitable regions 620 in which it is difficult to surveil the target object 70 by the image capturing apparatus 50, based on distribution of the surveillance index in the target region 60. The suitability computation unit 140 obtains the length of the route 622 in a case where the target object 70 passes through the surveillance-unsuitable region 620 for each surveillance-unsuitable region 620. The suitability computation unit 140 computes the suitability based on the length of the route 622. The details will be described below.

The suitability computation unit 140 acquires the surveillance index for each position $p_i$ in the target region 60 from the index computation unit 120. The suitability computation unit 140 extracts the position $p_i$ at which the surveillance has difficulty, based on a predetermined reference for the surveillance index. Information indicating the reference is stored in the storage unit 100 in advance, and the suitability computation unit 140 can read and use the information for extraction. The reference for extracting the position $p_i$ at which the surveillance has difficulty is, for example, a threshold value.

Specifically, in a case where the surveillance index is the surveillance-unsuitability index, the position $p_i$ at which the surveillance-unsuitability index is equal to or higher than the threshold value is extracted as the position $p_i$ at which the surveillance has difficulty. On the other hand, in a case where the surveillance index is the surveillance suitability index, the position $p_i$ at which the surveillance suitability index is equal to or lower than the threshold value is extracted as the position $p_i$ at which the surveillance has difficulty.

Then, the suitability computation unit 140 determines whether or not the extracted positions $p_i$ are adjacent to each other. The suitability computation unit 140 groups a plurality of positions $p_i$ that are adjacent to each other to form a surveillance-unsuitable region 620. A plurality of surveillance-unsuitable regions 620 may be formed in the target region 60. Each surveillance-unsuitable region 620 is configured by the plurality of positions $p_i$ that are grouped together. Each surveillance-unsuitable region 620 may be also referred to as a surveillance-unsuitable region $S_n$ (n=1, . . . , N, N is a positive integer and indicates the number of surveillance-unsuitable regions 620) below.

The suitability computation unit 140 obtains, for each surveillance-unsuitable region 620, the length $d_n$ (n=1, . . . , N) of the route 622 in which the target object 70 passes through the formed surveillance-unsuitable region $S_n$. $d_n$ is also referred to as a region-passing route length below. Here, in a case where a plurality of routes for passing through the surveillance-unsuitable region $S_n$ are assumed, the suitability computation unit 140 obtains a representative value of the route length based on the lengths of the plurality of routes, and sets the representative value as $d_n$. The representative value is, for example, the maximum value, the average value, or the median value of the lengths of the plurality of routes. The suitability computation unit 140 may consider the size of the target object 70 when obtaining the length of each route, and may set the length of a range in which the target object 70 is completely hidden, as the length of the route. Considering the frequency of use of the route, the suitability computation unit 140 may set the length of the route estimated to be used the most frequently, as the representative value, or may set a value obtained by a weighted average in accordance with the frequency of use of the route, as the representative value. The frequency of use of the route may be input by the user, for example, based on the environment of the target region 60 and actual measurement data. The suitability computation unit 140 may estimate the frequency of use of the route based on the position of the route in the target region 60, the relation with the object 660, and the like.

Then, the suitability computation unit 140 performs statistical processing on $d_n$ and computes the suitability A based on the obtained statistical value D. For example, the suitability computation unit sets the maximum value of all the obtained $d_n$ is set as the statistical value D in accordance with Expression (2).

[Expression 2]

$$D = \max_{n=1,\ldots,N} d_n \tag{2}$$

The suitability computation unit 140 may obtain the statistical value D by using Expression (3) instead of Expression (2). That is, the suitability computation unit 140 may set the result of weighting and averaging the obtained plurality of $d_n$ as the statistical value D. Here, the weight $w_n$ may be constant, and the weight $w_n$ may be set to increase as the estimated frequency of use of the route becomes more.

[Expression 3]

$$D = \frac{\sum_{n=1}^{N} w_n d_n}{\sum_{n=1}^{N} w_n} \tag{3}$$

Figure 7:
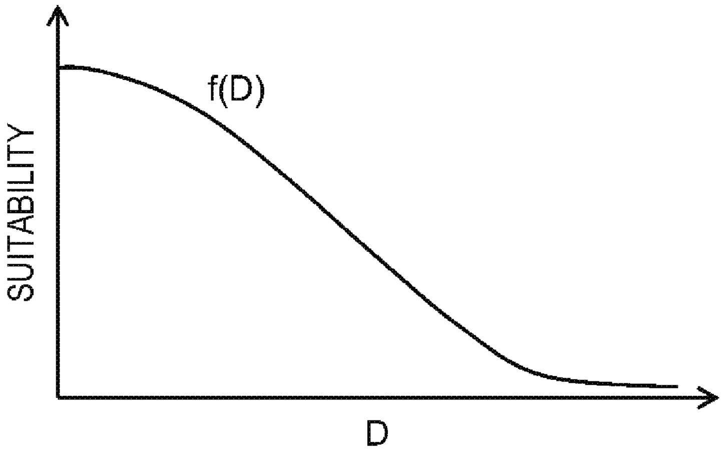
FIG. 7 is a graph illustrating a relation between a statistical value D and the suitability.

FIG. 7 is a graph illustrating a relation between the statistical value D and the suitability. The suitability computation unit 140 computes the suitability A from the statistical value D, for example, by using the monotonous non-increasing function f(D) as illustrated in FIG. 7. Here, A=f(D). That is, as the statistical value D becomes smaller, the suitability A increases.

The suitability computation unit 140 may compute the suitability A by using a plurality of references for extracting the position $p_i$ at which the surveillance has difficulty. Specifically, a plurality of threshold values $b_j$ are set as the reference in advance. The suitability computation unit 140 computes the suitability $A_j$ for each threshold value $b_j$ from the extraction result obtained by using the threshold value $b_j$, by a method similar to the method of computing the suitability A described above. The suitability computation unit performs statistical processing on the obtained plurality of pieces of suitability $A_j$, to compute the final suitability A. The statistical processing for obtaining the suitability A from the plurality of pieces of suitability $A_j$ includes, for example, computation of the average value, the median value, or the minimum value. The suitability computation unit 140 may further obtain the amount of change in the suitability A when changing the reference, and the amount of change may be used in the evaluation together with the suitability. For example, this means that, as the amount of change in the suitability A in response to the change of reference becomes smaller, it is difficult to decrease the suitability even though a strict reference is set. Therefore, the more preferable arrangement is made as the amount of change becomes smaller.

A specific example of computing the suitability will be described below with a plurality of arrangements. Examples in which the maximum value of the lengths of a plurality of routes for passing through the surveillance-unsuitable region 620 is set as the region-passing route length will be described below. A method of computing the region-passing route length is not limited to the examples.

A first example of the arrangement of the image capturing apparatus 50 will be described in detail with reference to FIGS. 2 and 6. FIG. 2 illustrates a state in which a rectangular room is viewed from the top. In this example, the planar shape of the target region 60 is a rectangle, and the image capturing apparatus 50 is located at each of opposing corners of the rectangle. The target region 60 in this example is surveilled by two image capturing apparatuses 50. Each image capturing apparatus 50 is directed toward the center of the short side opposite to the short side of the corner at which the image capturing apparatus 50 is located. In FIG. 2, the regions $S_1$ and $S_2$ are surveillance-unsuitable regions 620 different from each other. The region $S_1$ is far from an image capturing apparatus 50*a*, and is not included in an image capturing region of an image capturing apparatus 50*b*. Thus, the region $S_1$ is the surveillance-unsuitable region 620 in which the surveillance has difficulty. Similarly, the region $S_2$ is far from the image capturing apparatus 50*b*, and is not included in the image capturing region of the image capturing apparatus 50*a*. Thus, the region $S_2$ is the surveillance-unsuitable region 620 in which the surveillance has difficulty. In this manner, firstly, the regions $S_1$ and $S_2$ are specified.

Then, the suitability computation unit 140 obtains the region-passing route length. Assuming that the target object 70 proceeds straight, the route 622 indicated by the arrow in FIG. 6 is the longest route for the region $S_1$. In a case where the maximum value of the route length is used as the region-passing route length, the length of the route 622 is set as a region-passing route length $d_1$. Similarly, the region-passing route length $d_2$ can be obtained for the region $S_2$. The suitability computation unit 140 can compute the statistical value D using Expression (2) or (3) and further compute the suitability A.

Figure 8:
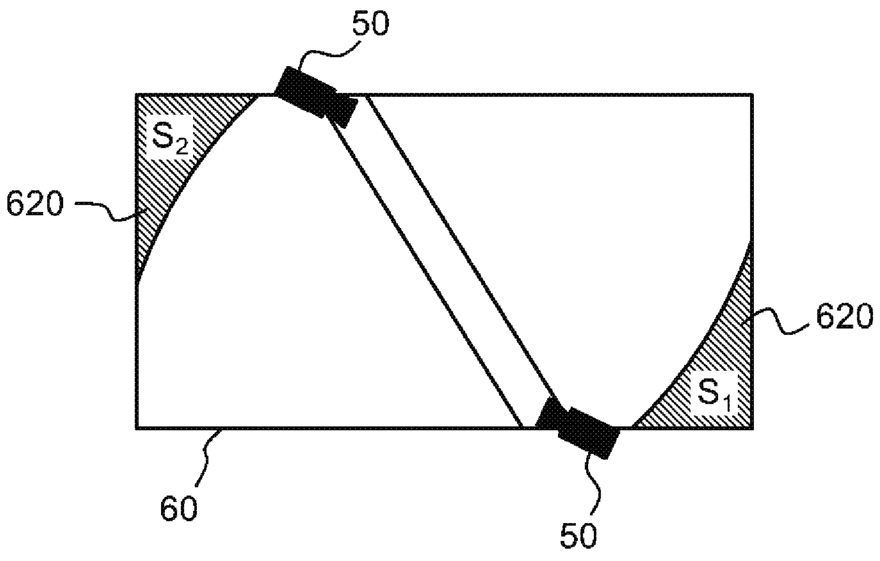
FIG. 8 is a diagram illustrating a second example of arrangement of the image capturing apparatus.

FIG. 8 is a diagram illustrating a second example of the arrangement of the image capturing apparatus 50. In the second example, the environmental information includes information indicating that a rectangular region is included in the target region 60, and the image capturing apparatus 50 is placed near a point closer to the center than to the end of the long side of the rectangle. FIG. 8 illustrates a state where the target region 60 being a rectangular region is viewed from the top. Also in this example, the planar shape of the target region 60 is rectangular. The target region 60 in this example is surveilled by two image capturing apparatuses 50. In this example, the image capturing apparatus 50 is not located at the corner of the rectangle, but located near (for example, within 1 m) a point in the middle of each of the two long sides of the rectangle, which face each other. That is, in this example, two image capturing apparatuses 50 are closer to the center of the long side than the two image capturing apparatuses 50 in the first example. The distance between the two image capturing apparatuses 50 in this example is shorter than the distance between the two image capturing apparatuses 50 in the first example. It should be noted that, "near" refers to a range in which the distance is, for example, within 1 m, below.

In the second example, similarly to the first example, the regions $S_1$ and $S_2$ are specified, and the region-passing route lengths $d_1$ and $d_2$ are obtained. Here, it is understood that the region-passing route length $d_1$ in the second example is shorter than the region-passing route length $d_1$ in the first example, and the region-passing route length $d_2$ in the second example is shorter than the region-passing route length $d_2$ in the first example. Therefore, the suitability A in the second example is higher than the suitability A in the first example, and the arrangement of the image capturing apparatus 50 in the second example is more preferable than the arrangement of the image capturing apparatus 50 in the first example.

Figure 9A:
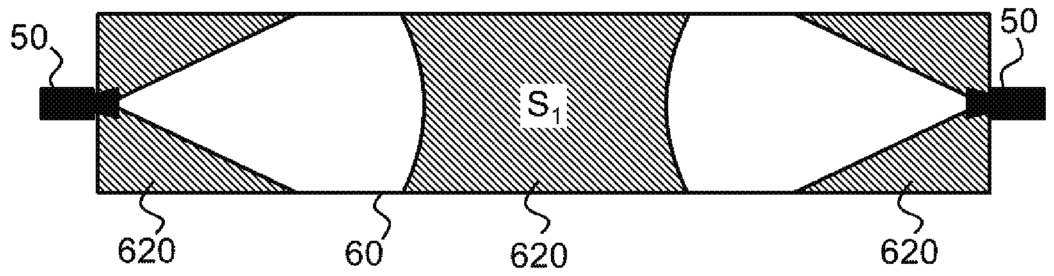
FIGS. 9(*a*) to 9(*c*) are diagrams illustrating third to fifth examples of the arrangement of the image capturing apparatus, respectively.
Figure 9B:
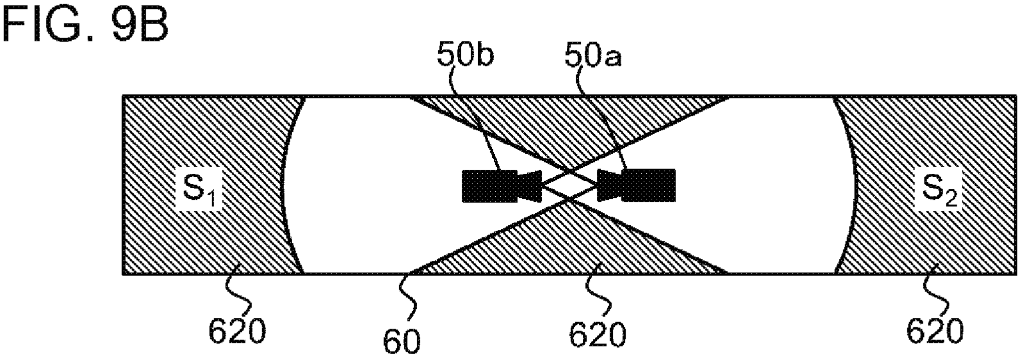
Figure 9C:
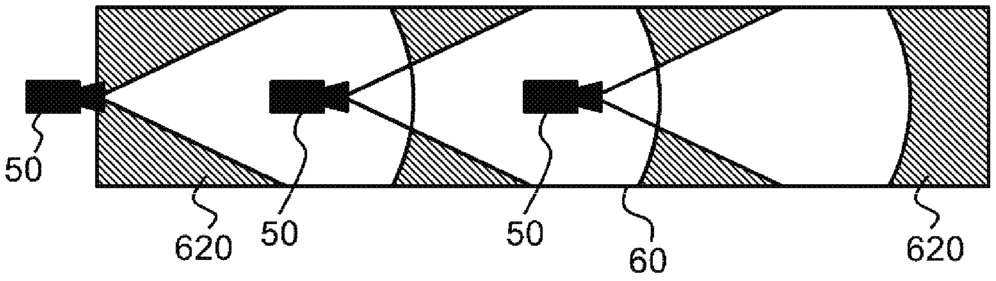

FIGS. 9(*a*) to 9(*c*) are diagrams illustrating third to fifth examples of the arrangement of the image capturing apparatus 50, respectively. In the third to fifth examples, the target region 60 is, for example, a passage, and the planar shape of the target region 60 is an elongated rectangle. That is, in the third to fifth examples, the environmental information includes information indicating that there is an elongated passage in the target region 60. FIGS. 9(*a*) to 9(*c*) illustrate a state where the elongated rectangle being the target region 60, specifically, a region of an elongated passage is viewed from the top. Here, the elongated rectangle and the elongated passage refer to, for example, a rectangle and a passage in which the length of the long side is three times or more the length of the short side. In the third and fourth examples, the target region 60 is surveilled by two image capturing apparatuses 50. In the fifth example, the target region 60 is surveilled by three image capturing apparatuses 50.

In the third example illustrated in FIG. 9(*a*), the image capturing apparatuses 50 are located near the midpoints of the two short sides, respectively. The two image capturing apparatuses 50 are directed toward the center of the target region 60 to face each other. In this example, as illustrated in FIG. 9(*a*), a plurality of surveillance-unsuitable regions 620 are specified. The region-passing route length in the center region $S_1$ among the surveillance-unsuitable regions has the maximum value. When the image capturing apparatuses 50 are provided at both ends of the target region 60 as in this example, it is easy to form a large surveillance-unsuitable region 620 in the center of the target region 60. As a result, the suitability A easily decreases.

In the fourth example illustrated in FIG. 9(*b*), the two image capturing apparatuses 50 are arranged near the center of the target region 60 so as to face in opposite directions to each other. Thus, the region-passing route length in the regions $S_1$ and $S_2$ located at both ends of the target region 60 has the maximum value. For example, in a case where the regions $S_1$ and $S_2$ are axial-symmetric or substantially axial-symmetric, the region-passing route length in the regions $S_1$ and $S_2$ in the fourth example is shorter than the region-passing route length in the region $S_1$ in the third example. Therefore, the suitability in the fourth example is higher than the suitability in the third example.

In the fourth example, the two image capturing apparatuses 50 are arranged in directions opposite to each other in the vicinity of the center of the elongated passage. An image of at least a region directly below one image capturing apparatus 50*b* is captured by the other image capturing apparatus 50*a* of the two image capturing apparatuses 50. An image of at least a region directly below the other image capturing apparatus 50*a* is captured by the one image capturing apparatus 50*b*. With such an arrangement, the arrangement of the image capturing apparatus 50 more suitable for surveillance is realized.

In this example, the image capturing apparatuses 50 are arranged so that a first region (for example, region $S_1$) and a second region (for example, region $S_2$) are not directly adjacent to each other and are not adjacent to each other with only a blind spot region interposed between the first region and second region. The first region is a region in which the difficulty of surveillance indicated by the surveillance index is higher than a predetermined reference, or the easiness of surveillance indicated by the surveillance index is lower than the reference. In addition, in a case where the target object 70 is placed in the first region, an image of the target object 70 is captured by a first image capturing apparatus 50*a*. The second region is a region in which the difficulty of surveillance indicated by the surveillance index is higher than the reference, or the easiness of surveillance indicated by the surveillance index is lower than the reference. In addition, in a case where the target object 70 is placed in the second region, an image of the target object 70 is captured by a second image capturing apparatus 50*b* located within a predetermined range (for example, within 30 m) from the first image capturing apparatus 50*a*. In a case where the target object 70 is placed in the blind spot region, an image of at least a portion of the target object 70 is not captured by any of one or more image capturing apparatuses 50. With such an arrangement, the arrangement of the image capturing apparatus 50 more suitable for surveillance is realized.

In the fifth example illustrated in FIG. 9(*c*), the environmental information includes information indicating that there is an elongated passage in the target region 60. The image capturing apparatuses 50 are arranged so that the orientations of the image capturing apparatuses 50 coincide with each other in the elongated passage. In this example, all the image capturing apparatuses 50 are directed in the same direction, specifically, in a direction parallel to the long side of the rectangle. A region close to one image capturing apparatus 50 is in the immediate vicinity of a region far from another image capturing apparatus 50. Specifically, for example, the distance between two adjacent image capturing apparatuses 50 is equal to or longer than 5 m or equal to or shorter than 30 m. With such an arrangement, it is possible to avoid an occurrence of a situation in which a region with a high surveillance-unsuitability index is continuously formed to be long. Thus, the suitability A tends to be high. As described above, in a case where the suitability computation unit 140 computes the suitability A using a plurality of references and further obtains the amount of change in the suitability A in response to the change of the reference, the amount of change in the fifth example is smaller than the amount of change in the third example. That is, this means that it is difficult to decrease the suitability even though a strict reference is set, in the fifth example, and thus the arrangement in the fifth example is more preferable.

Figure 10A:
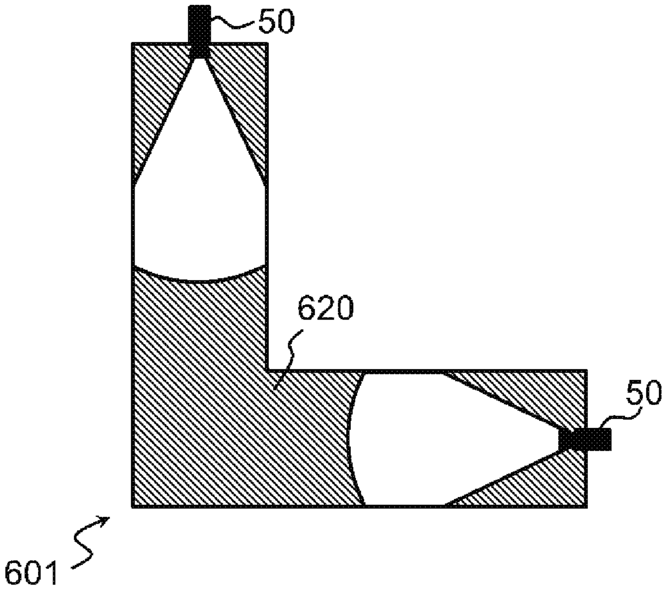
FIGS. 10(*a*) and 10(*b*) are diagrams illustrating a sixth example and a seventh example of the arrangement of the image capturing apparatus, respectively.
Figure 10B:
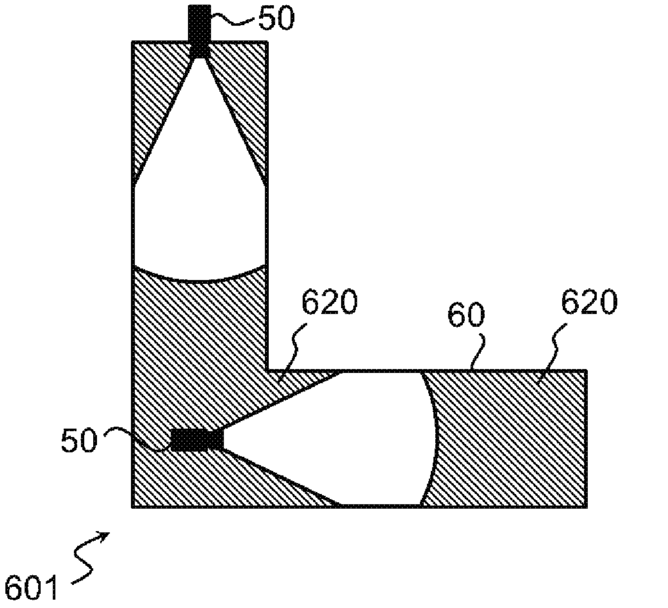

FIGS. 10(*a*) and 10(*b*) are diagrams illustrating a sixth example and a seventh example of the arrangement of the image capturing apparatus 50, respectively. In the sixth example and the seventh example, the target region 60 is, for example, a passage, and a bent portion 601 is in the planar shape of the target region 60. Each of FIGS. 10(*a*) and 10(*b*) illustrates a state where the target region 60 being a passage with the bent portion 601 is viewed from the top. The bent portion 601 is, for example, the corner of a passage. In FIGS. 10(*a*) and 10(*b*), the bent portion 601 is bent at 90°, but the bending angle is not particularly limited.

In the sixth example illustrated in FIG. 10(*a*), two image capturing apparatuses 50 are arranged toward the bent portion 601. The two image capturing apparatuses 50 are located at the ends of the target region 60, respectively. A large surveillance-unsuitable region 620 is formed in and around the bent portion 601. As a result, the suitability A tends to be low for the arrangement as in this example.

In the seventh example illustrated in FIG. 10(*b*), at least one image capturing apparatus 50 is located near the bent portion 601 and faces the end of the target region 60. With such an arrangement, it is possible to avoid an occurrence of a situation in which the surveillance-unsuitable region 620 near the bent portion 601 is formed largely. In the example in FIG. 10(*b*), the surveillance-unsuitable region 620 is formed at one end of the target region 60, but the region-passing route length in the surveillance-unsuitable region 620 is not as long as the region-passing route length in the surveillance-unsuitable region 620 around the bent portion 601 in the sixth example. Therefore, the suitability A in the seventh example is higher than the suitability A in the sixth example. In addition, since a region close to one image capturing apparatus 50 is in the immediate vicinity of a region far from another image capturing apparatus 50, the arrangement in the seventh example is preferable.

Figure 11A:
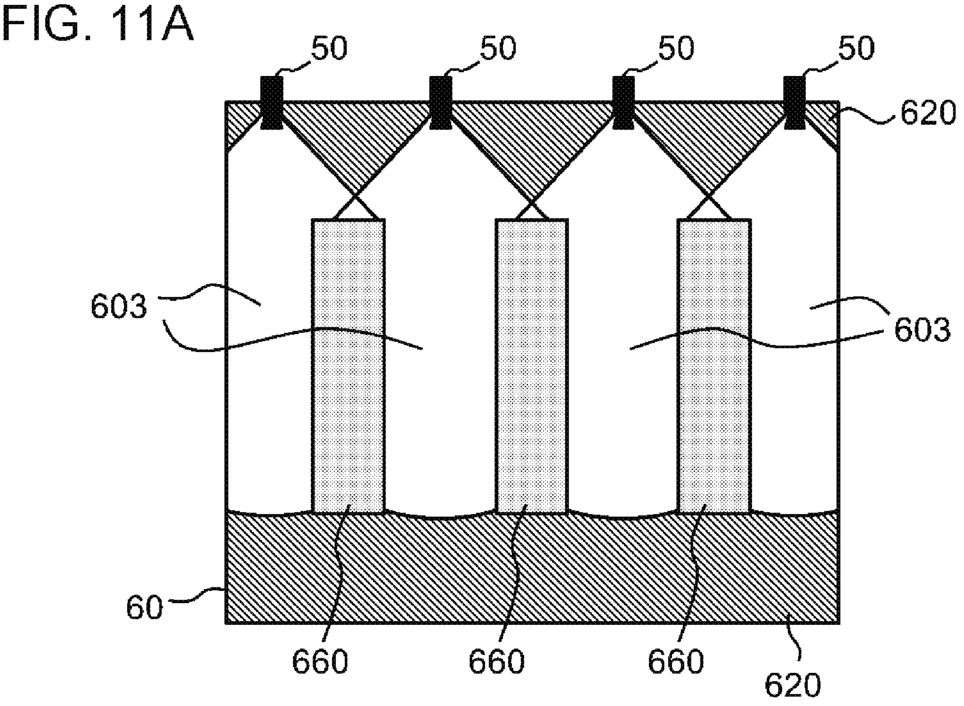
FIGS. 11(*a*) and 11(*b*) are diagrams illustrating an eighth example and a ninth example of the arrangement of the image capturing apparatus, respectively.
Figure 11B:
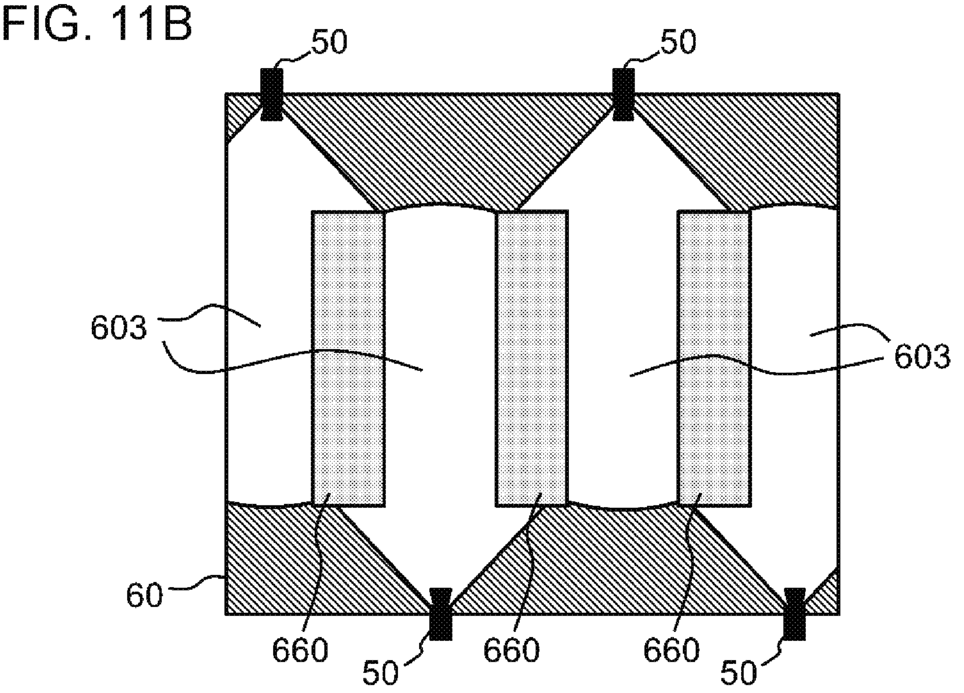

FIGS. 11(*a*) and 11(*b*) are diagrams illustrating an eighth example and a ninth example of the arrangement of the image capturing apparatus 50, respectively. In the eighth and ninth examples, the environmental information includes information indicating that a plurality of passages 603 interposing one or more objects 660 arranged in the target region 60 are present substantially in parallel in the target region 60. In the eighth and ninth examples, the target region 60 is, for example, a room in which shelves are arranged. FIGS. 11(*a*) and 11(*b*) illustrate a state where the room is viewed from the top. In the eighth and ninth examples, the planar shape of the target region 60 is rectangular, and the objects 660 having a rectangular planar shape are arranged in parallel in the target region 60. The long side of the object 660 is parallel to any side of the target region 60. There are a plurality of passages 603 in the target region 60. Each of the passages 603 is rectangular and is interposed between the object 660 and the object 660, or between the object 660 and the end of the target region 60.

In the eighth example illustrated in FIG. 11(*a*), the image capturing apparatus 50 is provided for each passage 603 so as to capture an image of all the passages 603 from the same direction. That is, a plurality of image capturing apparatuses 50 are arranged in the vicinity of the same side of the target region 60. As a result, a wide surveillance-unsuitable region 620 is formed around the side facing the side on which the image capturing apparatus 50 is provided, and the region-passing route length becomes long. Therefore, the suitability A tends to decrease for such an arrangement.

In the ninth example illustrated in FIG. 11(*b*), one image capturing apparatus 50 is provided for each of a plurality of passages 603, and the image capturing apparatuses 50 are arranged so that images of adjacent passages 603 are captured from different directions. That is, one or more image capturing apparatuses 50 are located in the vicinity of the two sides of the target region 60, which face each other. As a result, the surveillance-unsuitable region 620 is divided, and the region-passing route length is reduced. Thus, the suitability A tends to increase. As described above, the arrangement in the ninth example is more preferable than the arrangement in the eighth example.

<Hardware Configuration>

A hardware configuration of the evaluation apparatus 10 will be described below. Each functional component of the evaluation apparatus 10 may be realized by hardware (for example, hard-wired electronic circuit) that realizes each functional component, or may be realized by a combination of hardware and software (for example, combination of an electronic circuit and a program of controlling the electronic circuit). A case where each functional component of the evaluation apparatus 10 is realized by a combination of hardware and software will be further described below.

Figure 12:
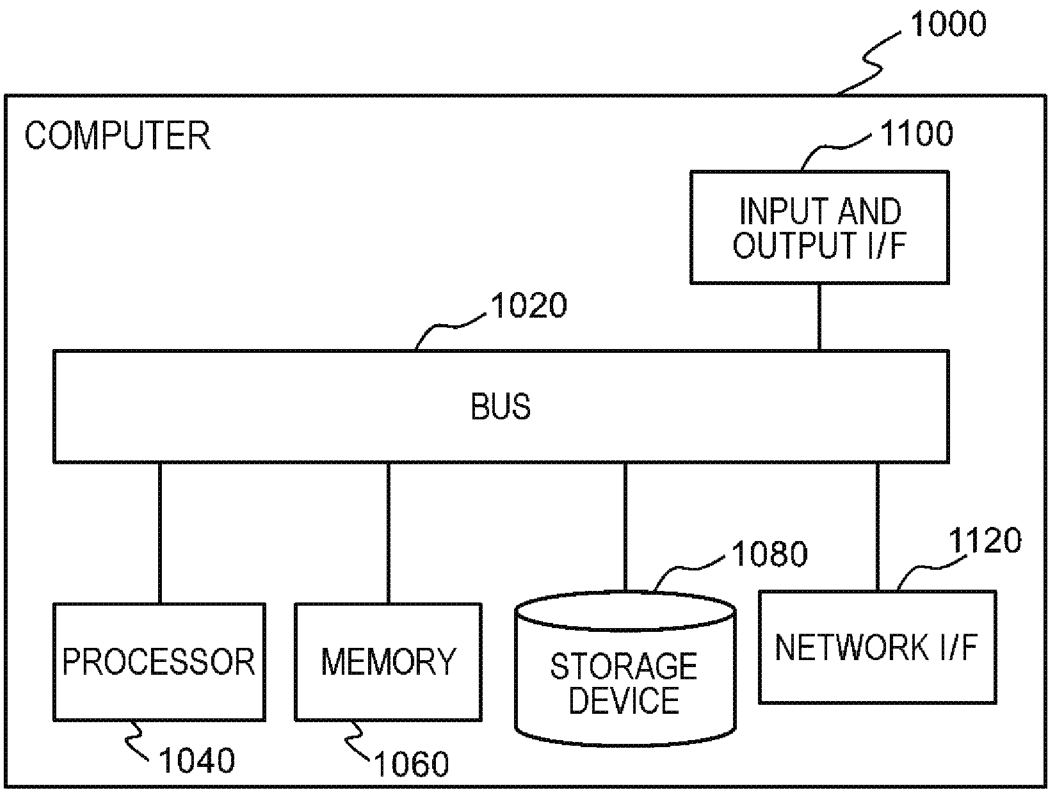
FIG. 12 is a diagram illustrating a computer of realizing the evaluation apparatus.

FIG. 12 is a diagram illustrating a computer 1000 of realizing the evaluation apparatus 10. The computer 1000 is any computer. For example, the computer 1000 is a personal computer (PC), a server machine, a tablet terminal, or a smartphone. The computer 1000 may be a dedicated computer designed to realize the evaluation apparatus 10 or a general-purpose computer.

The computer 1000 includes a bus 1020, a processor 1040, a memory 1060, a storage device 1080, an input and output interface 1100, and a network interface 1120. The bus 1020 is a data transmission path used when the processor 1040, the memory 1060, the storage device 1080, the input and output interface 1100, and the network interface 1120 transmit and receive data to and from each other. A method of connecting the processor 1040 and the like to each other is not limited to bus connection. The processor 1040 includes various processors such as a Central Processing Unit (CPU), a Graphics Processing Unit (GPU), and a Field-Programmable Gate Array (FPGA). The memory 1060 is a main storage realized using a Random Access Memory (RAM) or the like. The storage device 1080 is an auxiliary storage realized using a hard disk, a Solid State Drive (SSD), a memory card, a Read Only Memory (ROM), or the like.

The input and output interface 1100 is an interface for connecting the computer 1000 with input and output devices. For example, an input device such as a keyboard or an output device such as a display device is connected to the input and output interface 1100.

The network interface 1120 is an interface for connecting the computer 1000 to the network. The communication network is, for example, a Local Area Network (LAN) or a Wide Area Network (WAN). A method of the connection of the network interface 1120 to the network may be wireless connection or wired connection.

The storage device 1080 stores program modules that realize the acquisition unit 110, the index computation unit 120, and the suitability computation unit 140 in the evaluation apparatus 10. The processor 1040 realizes the function corresponding to each program module by reading each program module into the memory 1060 and executing the program module.

In a case where the storage unit 100 is provided in the evaluation apparatus 10, for example, the storage unit 100 is realized using the storage device 1080.

Next, the operation and the advantageous effect of the present example embodiment will be described. According to the evaluation apparatus 10 according to the present example embodiment, the surveillance index for each position $p_i$ in the target region 60 is computed, and the suitability of the arrangement of the image capturing apparatus 50 is obtained from the distribution of the surveillance index in the target region 60. With such a method, it is possible to evaluate the quality of the arrangement of the image capturing apparatus 50 in consideration of a situation of the entire target region 60. As a result, it is possible to obtain the arrangement of the image capturing apparatus 50 in the target region 60 in which overlooking of the target object 70 occurs less frequently.

Second Example Embodiment

An evaluation apparatus 10 according to the second example embodiment is the same as the evaluation apparatus 10 according to the first example embodiment except that the acquisition unit 110 further acquires target object information being information regarding the target object 70, and the index computation unit 120 further uses the target object information to compute the surveillance index.

The target object information includes, for example, at least any of information indicating the movement characteristics of the target object 70 and information indicating the density of a plurality of target objects 70 in the target region 60. The movement characteristics of the target object 70 are, for example, at least one of the direction and the speed of movement. In a case where the target object information includes information indicating the direction of the target object 70 moving, the target object information may further include information indicating the ratio (frequency) of the target object 70 moving in each movement direction.

At least one of the information indicating the movement characteristics and the information indicating the density may be given to each position $p_i$. At this time, the target object information is distribution information within the target region 60. At least one of the information indicating the movement characteristics and the information indicating the density may be given as a representative value in each region $r_i$. Here, each region $r_i$ is a set of a plurality of continuous position $p_i$, and can be freely defined. The target region 60 is partitioned into a plurality of regions $r_i$.

In a case where there are a plurality of expected movement routes of the target object 70 in the target region 60, at least one of the information indicating the movement characteristics and the information indicating the density may be given for each route. The target object information may further include information indicating the frequency with which each route is selected by the target object 70. Each route is associated with a plurality of continuous positions $p_i$ that overlap the route.

The acquisition unit 110 can acquire the target object information from the outside of the evaluation apparatus 10 or in the evaluation apparatus 10. For example, the user may perform an input operation on the evaluation apparatus 10, and the acquisition unit 110 may acquire the target object information based on the input contents of the user. The acquisition unit 110 may acquire the target object information from a detection unit such as a sensor or a camera. Further, the target object information may be stored in advance in the storage unit 100 provided outside or inside the evaluation apparatus 10, and the acquisition unit 110 may read and acquire the target object information.

The target object information may be obtained, for example, by prior research or simulation. Specifically, the target object information can be generated based on the average movement velocity and the average density of the target object 70 in the passage. In addition, in an open space such as a plaza, the target object information can be generated based on data such as how many target objects 70 move in which direction and by what route.

The target object information may be generated based on the environmental information and reference information. Specifically, in a case where the target object 70 is a person, the velocity on the stairs or slope is different from the velocity on a flat place. Thus, information indicating how the velocity of a person changes in accordance with the incline is prepared as the reference information. When the information is prepared as the reference information, and the environmental information includes information indicating the incline, it is possible to compute the velocity of the person by using the incline and the reference information. In a case where an apparatus such as an escalator or a moving walkway that automatically moves the target object 70 is provided in the target region 60, the movement velocity of the target object 70 can be obtained using the average velocity of the apparatus as the reference information. For example, the reference information is stored in the storage unit 100 in advance, and the acquisition unit 110 can acquire the target object information generated outside the evaluation apparatus 10 or inside the evaluation apparatus 10.

The target object information may be provided for each time slot (time range). For example, the amount of movement and the main movement direction of the target object 70 may differ depending on the morning, the daytime, and the evening. Therefore, the acquisition unit 110 may acquire the target object information for each time slot, and the index computation unit 120 may compute the surveillance index for each time slot.

The target object information may include information regarding the stop of the target object 70. The information regarding the stop is information indicating how frequency the target object 70 stops for each position $p_i$ or for each region $r_i$ in the target region 60 and how long the stopped state continues. The information regarding the stop may be handled separately from other target object information, as dwell information of the target object 70. The information regarding the stop may be information indicating the number of target objects 70, the frequency of the target object 70 staying at the position $p_i$ or in the region $r_i$, and the length of a staying time.

A first example of a method of computing the surveillance index using the target object information in the evaluation apparatus 10 according to the present example embodiment will be described below. In an acquisition step S110 in this example, the acquisition unit 110 acquires information indicating the movement direction of the target object 70 as the target object information. In an index computation step S120, the index computation unit 120 computes the surveillance index by assuming that it is easier to surveil the target object 70 as the movement direction of the target object 70 becomes closer to the direction toward the image capturing apparatus 50. The specific method is as follows.

In general, the easiness of identifying the target object 70 changes depending on the orientation of the target object 70. For example, in a case where the target object 70 is a person and the person faces the front of the image capturing apparatus 50, an image of the face is captured, and thus the person can be easily identified. On the other hand, in a case where the person faces the image capturing apparatus 50 sideways or backwards, identifying has more difficulty. Therefore, as the movement direction of the target object 70 for the position $p_i$ is closer to the direction toward the image capturing apparatus 50, it can be considered as being easier to surveil the target object 70 located at the position $p_i$. Specifically, in a case where the moving element in the direction toward the image capturing apparatus 50 is large, the surveillance-unsuitability index is decreased. In a case where the moving element away from the image capturing apparatus 50 is large, the surveillance-unsuitability index is increased.

In a case where the movement characteristics of a plurality of directions are mixed in the information indicating the movement direction at the position $p_i$, the index computation unit 120 computes the surveillance index by performing statistical processing (for example, averaging) for the plurality of directions. In the statistical processing, for example, weighting is performed using the density of the target object 70 moving in each direction. The index computation unit 120 may compute the surveillance index based on the direction having the most difficult in surveillance among the plurality of directions.

A second example of the method of computing the surveillance index by using the target object information in the evaluation apparatus 10 according to the present example embodiment will be described below. In the acquisition step S110 in this example, the acquisition unit 110 acquires the information indicating the density of a plurality of target objects 70, as the target object information. In the index computation step S120, the index computation unit 120 can compute the surveillance index by considering that it is more difficult to surveil the target object 70 as the density of the plurality of target objects 70 becomes higher. The specific method is as follows.

When the density of the target objects 70 becomes high, the target objects 70 tend to overlap in the image captured by the image capturing apparatus 50. Therefore, it is easy to lose sight of a tracking target. In addition, an error in association easily occurs between the plurality of target objects 70. Thus, the index computation unit 120 increases the surveillance-unsuitability index as the density of the target object 70 becomes higher. It should be noted that, the depression angle of the image capturing apparatus 50 and an angle θ formed by an optical axis of the image capturing apparatus 50 and the movement direction of the target object 70 have an influence on the easiness of overlapping and the degree of hiding of the target object 70, in addition to the density of the target object 70. For example, when the depression angle and θ become smaller, overlapping occurs more easily, and the degree of hiding increases. Thus, the surveillance-unsuitability index becomes higher. Therefore, the index computation unit 120 may compute the surveillance index based on the relation. For example, reference data (mathematical expression, graph, table, and the like) indicating the relation between the density of the target object 70, the depression angle of the image capturing apparatus 50, the angle θ, and the surveillance index is generated in advance based on experiments, simulations, computations, or the like. The reference data is stored in the storage unit 100. The index computation unit 120 can compute the surveillance index by using the density of the target object 70, the depression angle and the angle θ based on the arrangement information and the target object information, and the reference data read from the storage unit 100.

In a case where the target object information includes the dwell information of the target object 70, the index computation unit 120 may obtain the degree of a state where the target objects 70 overlap each other continuing, by using the density of the target object 70 and the average dwell time. Then, the index computation unit may compute the surveillance index by using the degree.

It should be noted that, the target object information may include both information indicating the movement direction of the target object 70 and the information indicating the density. The index computation unit 120 may compute the surveillance index by using both the information indicating the movement direction of the target object 70 and the information indicating the density. In the evaluation apparatus 10 according to the present example embodiment, the index computation unit 120 may compute the surveillance index in combination with the method described in the first example embodiment. Such a plurality of types of information and factors can be applied to the surveillance index by a method similar to the method described in the first example embodiment.

Next, the operation and the advantageous effect of the present example embodiment will be described. In the present example embodiment, the operation and the advantageous effect similar to those in the first example embodiment can be obtained. In addition, the index computation unit 120 computes the surveillance index at each position $p_i$ by further using the information regarding the target object 70, and thus it is possible to evaluate the arrangement of the image capturing apparatus 50 with higher accuracy.

Third Example Embodiment

An evaluation apparatus 10 according to a third example embodiment is the same as the evaluation apparatus 10 according to at least any of the first and second example embodiments except for points described below.

In the present example embodiment, the acquisition unit 110 further acquires information indicating the speed of movement of the target object 70. The suitability computation unit 140 computes the transit time $t_n$ taken when the target object 70 passes through the surveillance-unsuitable region based on the length $d_n$ of the route and the information indicating the speed of the target object 70 moving. The suitability computation unit computes the suitability based on the transit time $t_n$.

The suitability computation unit 140 computes the suitability based on the length $d_n$ of the route for passing through the surveillance-unsuitable region $S_n$. Here, even though the lengths $d_n$ of the route are equal to each other, the time taken to pass through the surveillance-unsuitable region $S_n$ varies when the velocity of the target object 70 varies. In a case where the target object 70 as a tracking target enters the surveillance-unsuitable region $S_n$, as the time taken to pass becomes longer, the ambiguity of the position estimation of the target object 70 increases, and a possibility of losing sight of the target object 70 as the tracking target increases. Thus, it is possible to perform the evaluation with higher accuracy by performing the evaluation with the time taken to move on the route, than the accuracy of the evaluation with the region-passing route length $d_n$ itself.

Specifically, in the acquisition step S110 in the present example embodiment, the acquisition unit 110 acquires information indicating the movement speed of the target object 70 as the target object information. The target object information is as described in the second example embodiment. In the target object information, each position $p_i$ or each region $r_i$ is associated with the speed of the target object 70. Then, the index computation step S120 is performed in a manner similar to the method according to at least any of the first and second example embodiments. In the suitability computation step S130, the suitability computation unit 140 firstly computes the speed of the target object 70 in each surveillance-unsuitable region $S_n$. The suitability computation unit 140 can set the speed of the target object 70 in the surveillance-unsuitable region $S_n$ by using the speed associated with any position $p_i$ or any region $r_i$ in the surveillance-unsuitable region $S_n$. The suitability computation unit 140 may set the average value, the mode value, the median value, or the like of the speed associated with the plurality of positions $p_i$ or the plurality of regions $r_i$ included in the surveillance-unsuitable region $S_n$, as the speed of the target object 70 in the surveillance-unsuitable region $S_n$. The suitability computation unit 140 obtains the transit time $t_n$ by dividing the region-passing route length $d_n$ by the speed of the target object 70 in the surveillance-unsuitable region $S_n$.

In a case where the velocity of the target object 70 varies for each section of the route for passing through the surveillance-unsuitable region $S_n$, it is possible to obtain the transit time $t_n$ by dividing the route into a plurality of sections, computing the transit time for each section, and summing up the transit times of all the sections. A plurality of routes may be provided in one surveillance-unsuitable region $S_n$, and a route may be provided which requires longer transit time than that of a case where the target object moves along the route corresponding to the region-passing route length $d_n$. Therefore, the transit time for all available routes may be computed, and the representative value may be set as the transit time $t_n$ of the surveillance-unsuitable region $S_n$.

Then, the suitability computation unit 140 performs statistical processing on $t_n$ and computes the suitability A based on the obtained statistical value τ. For example, the suitability computation unit sets the maximum value of all the obtained $t_n$ as the statistical value t in accordance with Expression (4).

[Expression 4]

$$\tau = \max_{n=1,\ldots,N} t_n \qquad (4)$$

The suitability computation unit 140 may obtain the statistical value t by using Expression (5) instead of Expression (4). That is, the suitability computation unit 140 may set the result of weighting and averaging the obtained plurality of $t_n$ as the statistical value τ. Here, the weight $w_n$ may be constant, and the weight $w_n$ may be set to increase as the estimated frequency of use of the route becomes more.

[Expression 5]

$$\tau = \frac{\sum_{n=1}^{N} w_n t_n}{\sum_{n=1}^{N} w_n} \qquad (5)$$

Then, the suitability computation unit 140 computes the suitability A from the statistical value τ by using the monotonous non-increasing function f(τ). Here, A=f(τ). That is, as the statistical value τ becomes smaller, the suitability A increases.

Next, the operation and the advantageous effect of the present example embodiment will be described. In the present example embodiment, the operation and the advantageous effect similar to those in the first example embodiment can be obtained. In addition, since the suitability computation unit 140 further uses the information indicating the movement speed of the target object 70 to compute the suitability, it is possible to evaluate the arrangement of the image capturing apparatus 50 with higher accuracy.

Fourth Example Embodiment

Figure 13:
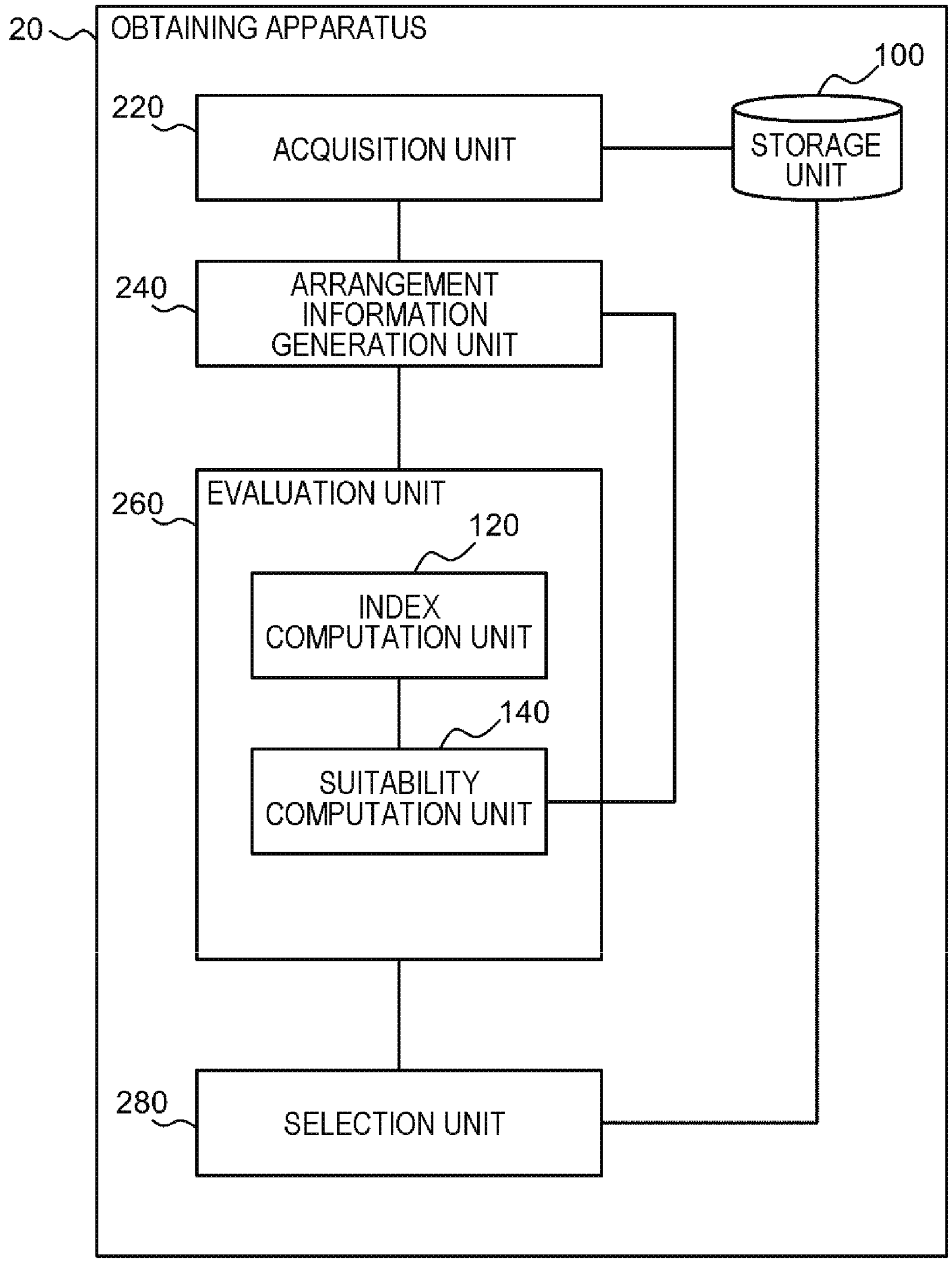
FIG. 13 is a block diagram illustrating a configuration of an obtaining apparatus according to a fourth example embodiment.

FIG. 13 is a block diagram illustrating a configuration of an obtaining apparatus 20 according to a fourth example embodiment. The obtaining apparatus 20 according to the present example embodiment obtains the arrangement of one or more image capturing apparatuses 50 that surveil the target region 60. The obtaining apparatus 20 includes an acquisition unit 220, an arrangement information generation unit 240, an evaluation unit 260, and a selection unit 280. The acquisition unit 220 acquires condition information indicating a condition regarding the arrangement of the image capturing apparatus 50 and environmental information indicating an environment of the target region 60. The arrangement information generation unit 240 generates a plurality of pieces of arrangement information including at least any of the position of the image capturing apparatus 50, the orientation of the image capturing apparatus 50, and the field angle of the image capturing apparatus 50, based on the condition information and the environmental information. The evaluation unit 260 evaluates the arrangement of the image capturing apparatus 50, which is indicated by the plurality of pieces of arrangement information. The selection unit 280 selects one or more pieces of the arrangement information from the plurality of pieces of the arrangement information, based on the evaluation result of the evaluation unit 260. The evaluation unit 260 includes an index computation unit 120 and a suitability computation unit 140. The index computation unit 120 computes, for each of a plurality of positions $p_i$ in the target region 60, a surveillance index by using the arrangement information and the environmental information, the surveillance index indicating difficulty or easiness of surveilling the target object 70 in a case where the target object 70 is located at each of the plurality of positions $p_i$. Thus, the suitability computation unit 140 computes the suitability of the arrangement of the image capturing apparatus 50 indicated by the arrangement information, based on the distribution of the surveillance index in the target region 60.

The index computation unit 120 according to the present example embodiment is the same as the index computation unit 120 according to at least any of the first to third example embodiments. The suitability computation unit 140 according to the present example embodiment is the same as the suitability computation unit 140 according to at least any of the first to third example embodiments.

Figure 14:
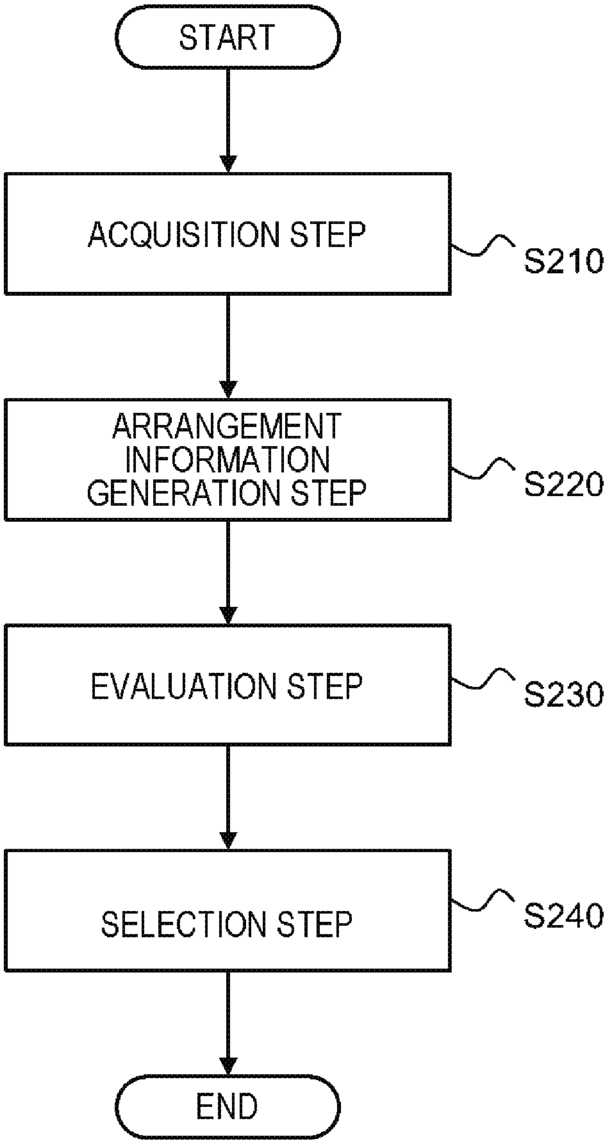
FIG. 14 is a flowchart illustrating an obtaining method according to the fourth example embodiment.
Figure 15:
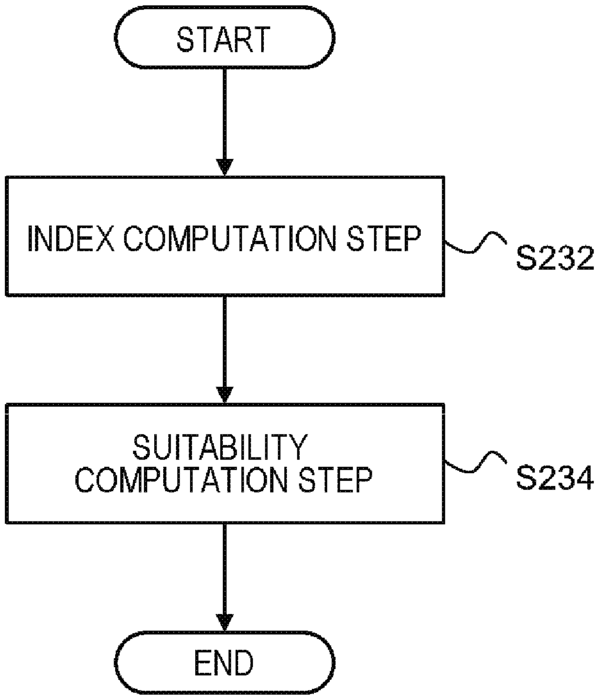
FIG. 15 is a flowchart illustrating contents of an evaluation step according to the fourth example embodiment.

FIG. 14 is a flowchart illustrating an obtaining method according to the fourth example embodiment. FIG. 15 is a flowchart illustrating contents of an evaluation step S230 according to the fourth example embodiment. The obtaining method in the present example embodiment is a method of obtaining the arrangement of one or more image capturing apparatuses 50 that surveil the target region 60. The present method includes an acquisition step S210, an arrangement information generation step S220, the evaluation step S230, and a selection step S240. In the acquisition step S210, the condition information indicating a condition regarding the arrangement of the image capturing apparatus 50 and the environmental information indicating the environment of the target region 60 are acquired. In the arrangement information generation step S220, a plurality of arrangement information including at least any of the position of the image capturing apparatus 50, the orientation of the image capturing apparatus 50, and the field angle of the image capturing apparatus 50 are generated based on the condition information and the environmental information. In the evaluation step S230, the arrangement of the image capturing apparatuses 50 indicated by the plurality of pieces of arrangement information is evaluated. In the selection step S240, one or more pieces of arrangement information are selected from the plurality of pieces of arrangement information based on the evaluation result in the evaluation step S230. The evaluation step S230 includes an index computation step S232, and a suitability computation step S234. In the index computation step S232, for each of a plurality of positions $p_i$ in the target region 60, the surveillance index indicating difficulty or easiness of surveilling the target object 70 in a case where the target object 70 is located at each of the plurality of positions $p_i$ is computed using the arrangement information and the environmental information. In the suitability computation step S234, the suitability of the arrangement of the image capturing apparatus 50 indicated by the arrangement information is computed based on the distribution of the surveillance index in the target region 60.

The obtaining method according to the present example embodiment is realized by the obtaining apparatus 20. The index computation step S232 according to the present example embodiment is the same as the index computation step S120 according to at least any of the first to third example embodiments. The suitability computation step S234 according to the present example embodiment is the same as the suitability computation step S130 according to at least any of the first to third example embodiments. This will be described in detail below.

The obtaining apparatus 20 according to the present example embodiment obtains the arrangement of the image capturing apparatus 50 in the target region 60. The obtaining apparatus 20 can obtain the position of the image capturing apparatus 50, the orientation of the image capturing apparatus 50, and the field angle of the image capturing apparatus 50, as the arrangement of the image capturing apparatus 50. Some of the position of the image capturing apparatus 50, the orientation of the image capturing apparatus 50, and the field angle of the image capturing apparatus 50 may be predetermined, and the obtaining apparatus 20 may obtain the remaining of the position of the image capturing apparatus 50, the orientation of the image capturing apparatus 50, and the field angle of the image capturing apparatus 50. For example, the position and the field angle of the image capturing apparatus 50 have already been defined, and a suitable orientation of the image capturing apparatus 50 may be obtained on the premise of the position and the field angle.

In the acquisition step S210, the acquisition unit 220 acquires the condition information and the environmental information from the outside of the obtaining apparatus 20 or inside the obtaining apparatus 20. For example, the user may perform an input operation on the obtaining apparatus 20, and the acquisition unit 220 may acquire the condition information and the environmental information based on the input contents of the user. The arrangement information and the environmental information may be stored in advance in the storage unit 100 provided outside or inside the obtaining apparatus 20, and the acquisition unit 220 may read and acquire the arrangement information and the environmental information. The storage unit 100 refers to any storage device. FIG. 13 illustrates an example in which the obtaining apparatus 20 includes the storage unit 100. It should be noted that, the acquisition unit 220 may further acquire the target object information in the acquisition step S210, similar to the acquisition step S110 in the second and third example embodiments. The acquisition unit 220 may acquire at least one of the environmental information and the target object information from the detection unit such as the sensor and the camera.

The condition information indicates restrictions on the arrangement of the image capturing apparatus 50. For example, the condition information includes at least any of the coordinate range of the region in which the image capturing apparatus 50 can be arranged, the angle range of the orientation that can be taken by the image capturing apparatus 50, the range of the field angle that can be taken by the image capturing apparatus 50, and the range of the number of the available image capturing apparatuses 50. The region in which the image capturing apparatus 50 can be arranged is defined in accordance with, for example, whether or not power can be supplied to the image capturing apparatus 50 or whether or not a fixing tool for the image capturing apparatus 50 can be attached. It should be noted that, the condition information may include at least any of the coordinate range in a region in which it is not possible to arrange the image capturing apparatus 50, and the angle range of the orientation of which adoption by the image capturing apparatus 50 is not possible. The coordinate space may be a coordinate system relative to the target region 60, or may be a real world coordinate system.

The environmental information is as described in the first example embodiment.

The arrangement information generation unit 240 generates a plurality of pieces of arrangement information in the arrangement information generation step S220. It should be noted that, one piece of arrangement information indicates arrangement of one pattern. Each piece of arrangement information is as described in the first example embodiment. In a case where the target region 60 is surveilled by a plurality of image capturing apparatuses 50, each piece of arrangement information includes information indicating the arrangement of the plurality of image capturing apparatuses 50. The arrangement information generation unit 240 generates the arrangement information indicating an arrangement pattern of the image capturing apparatus 50 that satisfies the conditions indicated by the condition information. It should be noted that, the arrangement information is associated with the environmental information. Thus, the arrangement of the image capturing apparatus 50 for the target region 60 is indicated by the arrangement information and the environmental information. It should be noted that, the position of the image capturing apparatus 50, which is indicated by the arrangement information is not necessarily required to be in the target region 60 as long as the image capturing apparatus 50 is capable of capturing an image of at least a portion of the target region 60.

Specifically, for example, the arrangement information generation unit 240 arranges a plurality of arrangement points of the image capturing apparatuses 50 that satisfy the conditions indicated by the condition information at regular intervals, and selects points corresponding to the number of available image capturing apparatuses 50, from the plurality of arrangement points. Then, information of the possible orientation taken by each image capturing apparatus 50 is added thereto and the arrangement information is set. The positions and the orientations of the available image capturing apparatuses 50 may be randomly defined in a range satisfying the condition indicated by the condition information.

In the evaluation step S230, the evaluation unit 260 evaluates the arrangement of the image capturing apparatus 50 indicated by each piece of arrangement information, by an evaluation method similar to the method performed by the evaluation apparatus 10 according to at least any of the first to third example embodiments. The evaluation unit 260 outputs the suitability for each piece of arrangement information. It should be noted that, the evaluation unit 260 may compute the suitability for each piece of arrangement information after acquiring all of the plurality of arrangement information from the arrangement information generation unit 240, or repeat acquisition of some pieces of the arrangement information and computation of the suitability.

The selection unit 280 acquires the suitability from the evaluation unit 260 as the evaluation result of each arrangement. Further, the selection unit 280 also acquires a plurality of pieces of arrangement information generated by the arrangement information generation unit 240. The suitability is associated with each piece of the plurality of arrangement information generated by the arrangement information generation unit 240. In the selection step S240, the selection unit 280 selects the arrangement information in which the suitability is the maximum among the plurality of pieces of arrangement information. The selected arrangement information is output from the selection unit 280. The suitability of the arrangement information may be output from the selection unit 280. The output arrangement information or the like is displayed by the display unit such as a display. The arrangement information is displayed, for example, by displaying a drawing illustrating a mark indicating the position, the orientation, and the like of the image capturing apparatus 50 on the plan view of the target region 60. The arrangement information and the like may be stored in the storage unit 100, or may be input to a device outside the obtaining apparatus 20.

It should be noted that, the selection unit 280 may output a plurality of pieces of arrangement information. The selection unit 280 can select and output the plurality of pieces of arrangement information the number of which is within a range of a predetermined value, for example, in descending order of suitability. The number of pieces of arrangement information to be output is input to the obtaining apparatus 20 by the user, for example. The user can adopt the freely-selected arrangement from the arrangements indicated by the plurality of pieces of output arrangement information.

The suitability computed by the evaluation unit 260 may be fed back to the arrangement information generation unit 240. That is, the arrangement information generation unit 240 acquires the suitability computed by the evaluation unit 260, and generates the arrangement information indicating the different arrangement based on the acquired suitability and the arrangement associated with the suitability. For example, the arrangement information generation unit 240 suppresses the generation of an arrangement similar to the arrangement having low suitability. As an example, the arrangement information generation unit 240 can roughly set the parameters used for generating the arrangement in the vicinity of the arrangement having low suitability.

Specifically, for example, in a case where points corresponding to the number of image capturing apparatuses 50 are selected from a plurality of arrangement points as described above, the arrangement information is not generated for combinations for all the arrangement points, but the arrangement points are selected from the rest obtained by excluding some arrangement points therefrom. Examples of the arrangement points to be excluded include arrangement points selected in the arrangement having low suitability. The arrangement information generation unit 240 may generate arrangement information by widening the interval between a plurality of arrangement points for an arrangement close to the arrangement having low suitability.

On the contrary, the arrangement information generation unit 240 may increase the generation of arrangements similar to the arrangements having high suitability. As an example, the arrangement information generation unit 240 finely sets the parameters used for generating the arrangement in the vicinity of the arrangement having high suitability. It should be noted that, the arrangement having high suitability means, for example, the arrangement having suitability which is higher than the predetermined reference. The arrangement having low suitability means, for example, the arrangement having suitability which is lower than the predetermined reference.

In addition, generation of the arrangement information and computation of the suitability may be performed by a coarse to fine search approach. That is, firstly, a plurality of arrangements are roughly set, and the suitability of the arrangement is computed. Then, the finer arrangement is set in the vicinity of the arrangement having high suitability, and the suitability is computed. Specifically, for example, in a case where points corresponding to the number of image capturing apparatuses 50 are selected from a plurality of arrangement points as described above, in a first step, a plurality of arrangement points are determined at wide intervals, and one or more arrangements having high suitability are obtained. Then, as a second step, the interval between the plurality of arrangement points is made narrower than the interval in the first step, and the arrangement information of the arrangement similar to the arrangement obtained in the first step is generated. In the next step, the similar process may be continued at a narrower arrangement point interval. In this manner, the arrangement having high suitability can be efficiently obtained.

The obtaining apparatus 20 may obtain the arrangement of the image capturing apparatus 50 for each of the plurality of time ranges. In this case, at least any type of information acquired by the acquisition unit 220 is defined for each of the plurality of time ranges. Here, the information acquired by the acquisition unit 220 is either a case of the condition information and the environmental information, or a case of the condition information, the environmental information, and the target object information. In a case where at least one of the condition information and the environmental information is defined for each time range, the arrangement information generation unit 240 generates a plurality of pieces of arrangement information for each time range. In a case where at least any of the arrangement information, the environmental information, and the target object information is defined for each time range, the evaluation unit 260 outputs the evaluation result for each time range. Thus, in a case where the evaluation unit 260 outputs the evaluation result for each time range, the selection unit 280 selects and outputs the arrangement for each time range. In this manner, the user can know the suitable arrangement for each time range.

As described above, the obtaining apparatus 20 according to the present example embodiment can obtain the arrangement of the image capturing apparatus 50 suitable for surveilling the target region 60 within the range satisfying the predetermined conditions.

For example, the user of the evaluation apparatus 10 can input the information regarding the target region 60 intended to be surveilled and the arrangement conditions of the image capturing apparatus 50 to the obtaining apparatus 20 and adopt the output arrangement. According to the obtaining apparatus 20 and the obtaining method according to the present example embodiment, for example, in the first example embodiment, the arrangements described in the first to ninth examples of the arrangement of the image capturing apparatus 50 can be obtained.

The obtaining apparatus 20 according to the present example embodiment can be realized by, for example, the computer 1000 as illustrated in FIG. 12. The storage device 1080 stores program modules that realize the acquisition unit 220, the arrangement information generation unit 240, the evaluation unit 260, the index computation unit 120, the suitability computation unit 140, and the selection unit 280 in the obtaining apparatus 20. The processor 1040 realizes the function corresponding to each program module by reading each program module into the memory 1060 and executing the program module.

Next, the operation and the advantageous effect of the present example embodiment will be described. According to the obtaining apparatus 20 according to the present example embodiment, the preferable arrangement of the image capturing apparatus 50 is obtained based on the evaluation result in consideration of the situation of the entire target region 60. In this manner, it is possible to know the arrangement of the image capturing apparatus 50 in the target region 60 in which overlooking of the target object 70 occurs less frequently.

Fifth Example Embodiment

In a surveillance method according to a fifth example embodiment, the image capturing apparatus 50 is arranged based on the arrangement determined using the evaluation apparatus 10 according to at least any of the first to third example embodiments or the obtaining apparatus 20 according to the fourth example embodiment, and the target region 60 is surveilled.

In a case using the evaluation apparatus 10, the user prepares a plurality of candidates for the arrangement of the image capturing apparatus 50. Then, information of each arrangement candidate is input to the evaluation apparatus 10, and the acquisition unit 110 acquires the arrangement information. The user inputs information regarding the target region 60 to the evaluation apparatus 10, and the acquisition unit 110 acquires the environmental information. The user may further input the target object information to the evaluation apparatus 10. The evaluation apparatus 10 outputs the suitability of each candidate. The user compares a plurality of pieces of the suitability of a plurality of output candidates with each other, and determines the candidate having the highest suitability as the arrangement of the image capturing apparatus 50. Then, the user installs the image capturing apparatus 50 in accordance with the determined arrangement.

On the other hand, in a case using the obtaining apparatus 20, the user inputs the arrangement conditions for the image capturing apparatus 50 to the obtaining apparatus 20, and the acquisition unit 220 acquires the condition information. The user inputs information regarding the target region 60 to the obtaining apparatus 20, and the acquisition unit 220 acquires the environmental information. The user may further input the target object information to the obtaining apparatus 20. The obtaining apparatus 20 outputs information indicating the arrangement of the image capturing apparatus 50 suitable for surveilling the target region 60. The user installs the image capturing apparatus 50 in accordance with the arrangement of the image capturing apparatus 50 output by the obtaining apparatus 20.

Figure 16:
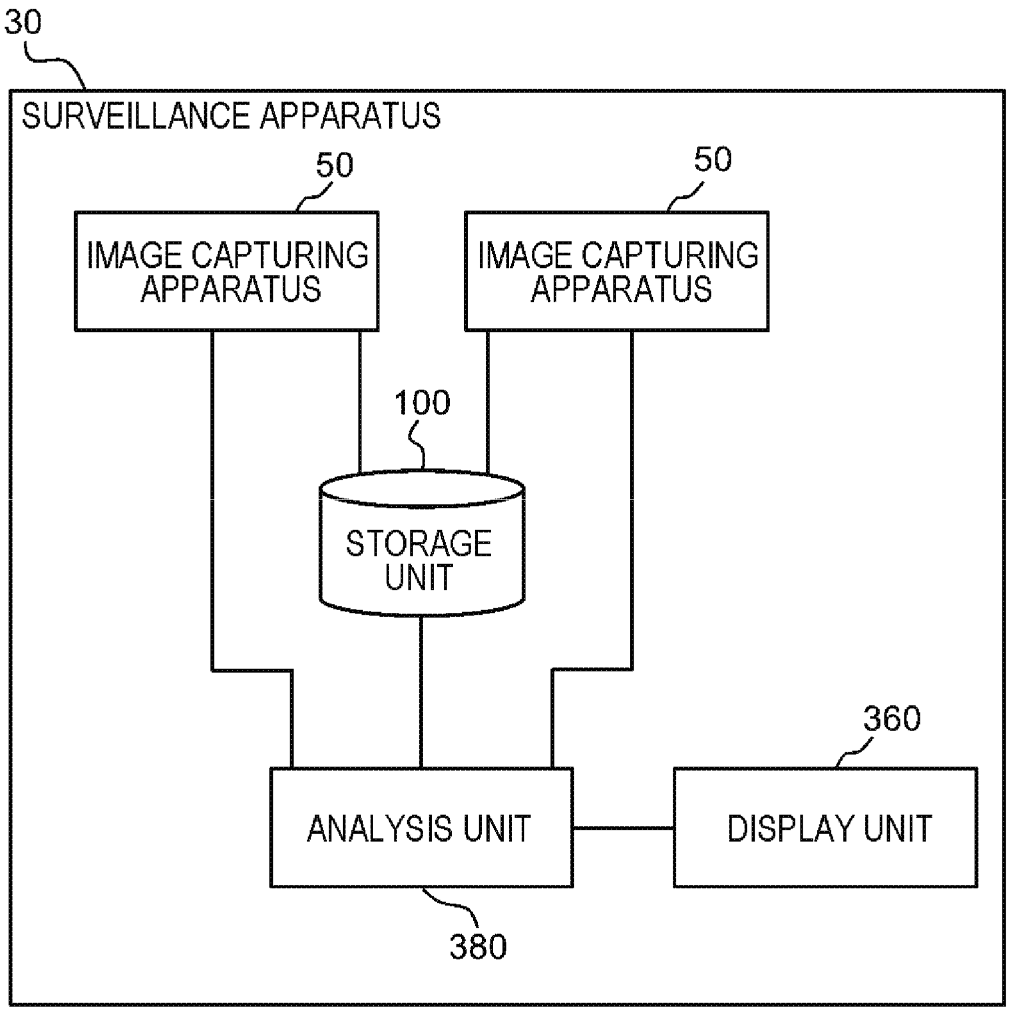
FIG. 16 is a block diagram illustrating a configuration of a surveillance apparatus according to a fifth example embodiment.

FIG. 16 is a block diagram illustrating a configuration of a surveillance apparatus 30 according to the fifth example embodiment. In the example in FIG. 16, the surveillance apparatus 30 includes an analysis unit 380, a display unit 360, a storage unit 100, and a plurality of image capturing apparatuses 50. The image capturing apparatuses 50 are arranged based on the arrangement determined using the evaluation apparatus 10 according to at least any of the first to third example embodiments or the obtaining apparatus 20 according to the fourth example embodiment.

In the surveillance apparatus 30 and a surveillance method according to the present example embodiment, for example, in the first example embodiment, the image capturing apparatuses 50 can be arranged as described in the first to ninth examples of the arrangement of the image capturing apparatus 50.

Each image capturing apparatus 50 captures an image of at least a portion of the target region 60. It should be noted that, the position, the orientation, the field angle, and the like of the image capturing apparatus 50 may be further finely adjusted by the user, an observer, or the like. In a case where the arrangement that varies depending on the time slot is preferable as a result of the processing of the evaluation apparatus 10 or the obtaining apparatus 20, the arrangement of the image capturing apparatus 50 may be changed in a timely manner by the user, the observer, or the like.

Image information output from each image capturing apparatus 50 is input to the analysis unit 380. The analysis unit 380 analyzes the image information from the image capturing apparatus 50. The analysis performed by the analysis unit 380 is, for example, detection or tracking of the target object 70. For example, the image captured by the image capturing apparatus 50 and the analysis result by the analysis unit 380 are displayed on the display unit 360 and are provided for the observer. Thus, the observer can recognize the situation of the target object 70 in the target region 60.

In the image displayed on the display unit 360, for example, a frame surrounding the target object 70 may also be displayed based on the detection result by the analysis unit 380, or an ID assigned to the target object 70 may also be displayed based on the tracking result by the analysis unit 380. An abnormal movement of the target object 70 may be detected based on the result of detecting and tracking the target object 70. An alert may be given.

It should be noted that, not an image itself captured by the image capturing apparatus 50 may be displayed, but only the analysis result by the analysis unit 380 may be displayed, on the display unit 360. For example, the position and movement trajectory of the target object 70 may be displayed on a map based on the tracking result. Then, when the observer wants to check the image captured by the specific image capturing apparatus 50, the image may be displayed by performing an operation for issuing a display processing command.

It should be noted that, the image information output from each image capturing apparatus 50 may be stored in the storage unit 100. The surveillance apparatus 30 may not include the analysis unit 380. The image information output from each image capturing apparatus 50 may be directly input to and displayed on the display unit 360 without passing through the analysis unit 380.

The surveillance apparatus 30 according to the present example embodiment can be realized using, for example, the computer 1000 as illustrated in FIG. 12. The storage device 1080 stores a program module that realizes the analysis unit 380 in the surveillance apparatus 30. The processor 1040 realizes the function corresponding to each program module by reading each program module into the memory 1060 and executing the program module.

The display unit 360 is, for example, a display device connected to the input and output interface 1100. It should be noted that, the display unit 360 may be connected to the computer 1000 through the network interface 1120.

Next, the operation and the effect of the present example embodiment will be described. According to the surveillance apparatus 30 according to the present example embodiment, the surveillance is performed in the preferable arrangement of the image capturing apparatus 50, which is obtained based on the evaluation result in consideration of the situation of the entire target region 60. In this manner, it is possible to surveil the target region 60 in which overlooking of the target object 70 occurs less frequently.

Sixth Example Embodiment

Figure 17:
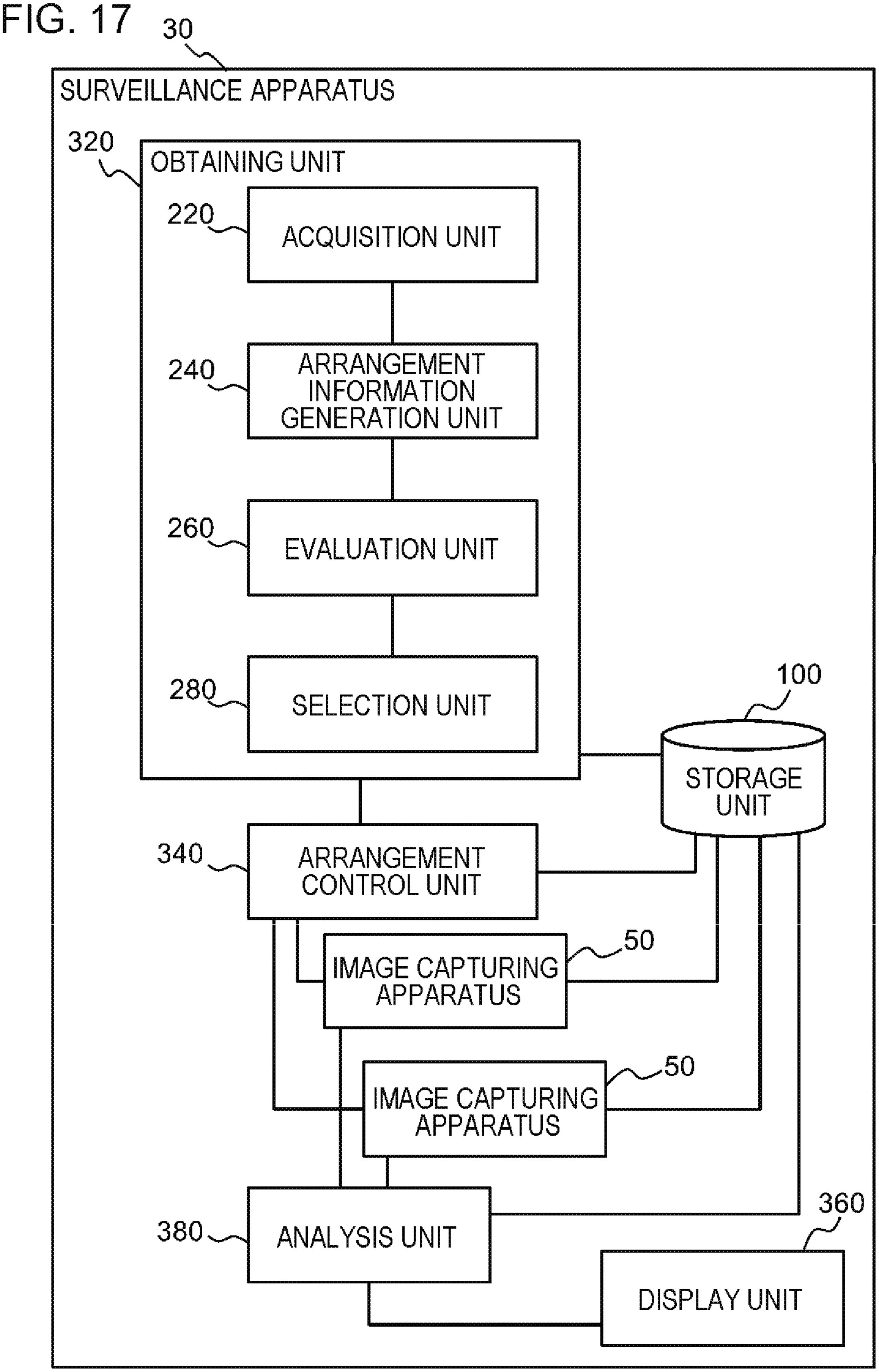
FIG. 17 is a block diagram illustrating a configuration of a surveillance apparatus according to a sixth example embodiment.

FIG. 17 is a block diagram illustrating a configuration of a surveillance apparatus 30 according to a sixth example embodiment. The surveillance apparatus 30 according to the present example embodiment is the same as the surveillance apparatus 30 according to the fifth example embodiment except for the points described below.

The surveillance apparatus 30 according to the present example embodiment surveils the target region 60 with one or more image capturing apparatuses 50. The surveillance apparatus includes an obtaining unit 320 and an arrangement control unit 340. The obtaining unit 320 obtains an arrangement of the image capturing apparatus 50. The arrangement control unit 340 controls the arrangement of the image capturing apparatus 50 based on the arrangement of the image capturing apparatus 50 obtained by the obtaining unit 320. The obtaining unit 320 includes an acquisition unit 220, an arrangement information generation unit 240, an evaluation unit 260, and a selection unit 280. The acquisition unit 220 acquires condition information indicating a condition regarding the arrangement of the image capturing apparatus 50 and environmental information indicating an environment of the target region 60. The arrangement information generation unit 240 generates a plurality of pieces of arrangement information including at least any of the position of the image capturing apparatus 50, the orientation of the image capturing apparatus 50, and the field angle of the image capturing apparatus 50, based on the condition information and the environmental information. The evaluation unit 260 evaluates the arrangement of the image capturing apparatus 50, which is indicated by the plurality of pieces of arrangement information. The selection unit 280 selects one or more pieces of the arrangement information from the plurality of pieces of the arrangement information, based on the evaluation result of the evaluation unit 260. The evaluation unit 260 includes an index computation unit 120 and a suitability computation unit 140. The index computation unit 120 computes, for each of a plurality of positions $p_i$ in the target region 60, a surveillance index by using the arrangement information and the environmental information, the surveillance index indicating difficulty or easiness of surveilling the target object 70 in a case where the target object 70 is located at each of the plurality of positions $p_i$. The suitability computation unit 140 computes the suitability of the arrangement of the image capturing apparatus 50 indicated by the arrangement information, based on the distribution of the surveillance index in the target region 60.

In the present example embodiment, the surveillance apparatus 30 further includes an image capturing apparatus 50, an analysis unit 380, and a display unit 360.

The surveillance apparatus 30 according to the present example embodiment is also described as follows, for example. The surveillance apparatus 30 surveils the target region 60 with one or more image-capturing-apparatus 50. The surveillance apparatus includes at least one of the analysis unit 380 that analyzes an image captured by the image capturing apparatus 50 and the display unit 360 that displays the image. The image capturing apparatus 50 is placed based on the arrangement information obtained based on the distribution of the surveillance index in the target region 60. The surveillance index is computed based on the environmental information indicating the environment of the target region 60 for each of a plurality of positions $p_i$ in the target region 60, and indicates the difficulty or the easiness of surveillance of the target object 70 in a case where the target object 70 is located at each of the plurality of positions $p_i$. In addition, the arrangement information indicates at least any of the position of the image capturing apparatus 50, the orientation of the image capturing apparatus 50, and the field angle of the image capturing apparatus 50.

The index computation unit 120 according to the present example embodiment is the same as the index computation unit 120 according to at least any of the first to third example embodiments. The suitability computation unit 140 according to the present example embodiment is the same as the suitability computation unit 140 according to at least any of the first to third example embodiments. The acquisition unit 220, the arrangement information generation unit 240, the evaluation unit 260, and the selection unit 280 according to the present example embodiment are the same as the acquisition unit 220, the arrangement information generation unit 240, the evaluation unit 260, and the selection unit 280 according to the fourth example embodiment, respectively. The analysis unit 380 and the display unit 360 according to the present example embodiment are the same as the analysis unit 380 and the display unit 360 according to the fifth example embodiment, respectively.

Figure 18:
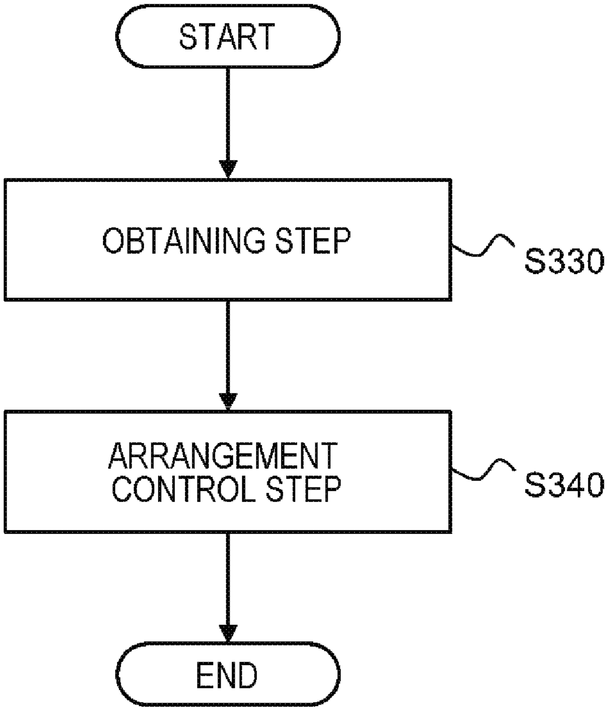
FIG. 18 is a flowchart illustrating a surveillance method according to the sixth example embodiment.

FIG. 18 is a flowchart illustrating a surveillance method according to the sixth example embodiment. It should be noted that, the content of an obtaining step S330 in the present example embodiment is illustrated by the flowchart which is the same as the flowchart in FIG. 14. The content of an evaluation step S230 in the present example embodiment is illustrated by the flowchart which is the same as the flowchart in FIG. 15.

The surveillance method according to the present example embodiment is a method of surveilling the target region 60 with one or more image capturing apparatuses 50. The method includes the obtaining step S330 and an arrangement control step S340. In the obtaining step S330, the arrangement of the image capturing apparatus 50 is obtained. In the arrangement control step S340, the arrangement of the image capturing apparatus 50 is controlled based on the arrangement of the image capturing apparatus 50, which is obtained in the obtaining step S330. The obtaining step S330 includes an acquisition step S210, an arrangement information generation step S220, the evaluation step S230, and a selection step S240. In the acquisition step S210, the condition information indicating a condition regarding the arrangement of the image capturing apparatus 50 and the environmental information indicating the environment of the target region 60 are acquired. In the arrangement information generation step S220, a plurality of arrangement information indicating at least any of the position of the image capturing apparatus 50, the orientation of the image capturing apparatus 50, and the field angle of the image capturing apparatus 50 are generated based on the condition information and the environmental information. In the evaluation step S230, the arrangement of the image capturing apparatuses 50 indicated by the plurality of pieces of arrangement information is evaluated. In the selection step S240, one or more pieces of arrangement information are selected from the plurality of pieces of arrangement information based on the evaluation result in the evaluation step S230. The evaluation step S230 includes an index computation step S232, and a suitability computation step S234. In the index computation step S232, the surveillance index indicating difficulty or easiness of surveilling the target object 70 in a case where the target object 70 is located at each of a plurality of positions $p_i$ in the target region 60 is computed using the arrangement information and the environmental information for each of the plurality of positions $p_i$. In the suitability computation step S234, the suitability of the arrangement of the image capturing apparatus 50 indicated by the arrangement information is computed based on the distribution of the surveillance index in the target region 60.

The surveillance method according to the present example embodiment is realized by the surveillance apparatus 30 according to the present example embodiment. The index computation step S232 according to the present example embodiment is the same as the index computation step S120 according to at least any of the first to third example embodiments. The suitability computation step S234 according to the present example embodiment is the same as the suitability computation step S130 according to at least any of the first to third example embodiments. The acquisition step S210, the arrangement information generation step S220, the evaluation step S230, and the selection step S240 according to the present example embodiment are the same as the acquisition step S210, the arrangement information generation step S220, the evaluation step S230, and the selection step S240 according to the fourth example embodiment, respectively. This will be described in detail below.

In the present example embodiment, at least any of the position of the image capturing apparatus 50, the orientation of the image capturing apparatus 50, and the field angle of the image capturing apparatus 50 can be controlled by the arrangement control unit 340. For example, the image capturing apparatus 50 is attached to a drive device that changes at least one of the position and the orientation of the image capturing apparatus. In addition, the field angle of the image capturing apparatus 50 can be adjusted by a signal from the arrangement control unit 340. Specifically, for example, the image capturing apparatus 50 is a mobile camera capable of changing the position or the pose of the image capturing apparatus by the external control. The image capturing apparatus 50 may be an apparatus such as a PZT camera, of which the orientation and the zoom ratio can be controlled from the outside, or may be an apparatus such as an Unmanned Aerial Vehicle (UAV), which is capable of floating in the air and capturing an image. The image capturing apparatus 50 may be a camera installed on a wall or ceiling to be able to move in the shape of a laid rail. Alternatively, the image capturing apparatus 50 may be a camera mounted on a movable robot.

In the obtaining step S330, the obtaining unit 320 obtains the arrangement of the image capturing apparatus 50 by the same obtaining method as that performed by the obtaining apparatus 20 according to the fourth example embodiment. In the present example embodiment, the range that can be controlled by the arrangement control unit 340 is applied as the range in which image capturing apparatus 50 can be arranged, to the condition information acquired by the acquisition unit 220.

The arrangement information output from the obtaining unit 320 is input to the arrangement control unit 340. It should be noted that, the arrangement information output from the obtaining unit 320 may be stored once in the storage unit 100, and the arrangement control unit 340 may read and acquire the information. The arrangement control unit 340 controls at least any of the position of the image capturing apparatus 50, the orientation of the image capturing apparatus 50, and the field angle of the image capturing apparatus 50, based on the acquired arrangement information. Specifically, for example, a control signal is transmitted from the arrangement control unit 340 to the drive device or the like to which the image capturing apparatus 50 is attached. FIG. 17 illustrates an example in which the surveillance apparatus 30 includes the storage unit 100.

The image capturing apparatus 50 surveils the target region 60 in an arrangement adjusted by the arrangement control unit 340. An image captured by the image capturing apparatus 50 is processed in the similar manner to that in the fifth example embodiment.

The obtaining unit 320 may obtain the arrangement of the image capturing apparatus 50 for each of a plurality of time ranges, and the arrangement control unit 340 may control the arrangement for each time range. The method of evaluating and obtaining the arrangement for each time range is as described, for example, in the first, second, and fourth example embodiments. The obtaining unit 320 obtains the arrangement of the image capturing apparatus 50 for each of the plurality of time ranges, and generates a timetable for the arrangement of the image capturing apparatus 50. The generated timetable is stored in, for example, the storage unit 100. The arrangement control unit 340 changes the arrangement of the image capturing apparatus 50 for each time range, in accordance with the timetable read from the storage unit 100. In this manner, the surveillance is normally performed with the suitable arrangement of the image capturing apparatus 50.

The surveillance apparatus 30 according to the present example embodiment can be realized using, for example, the computer 1000 as illustrated in FIG. 12. The storage device 1080 stores program modules that realize the obtaining unit 320, the acquisition unit 220, the arrangement information generation unit 240, the evaluation unit 260, the index computation unit 120, the suitability computation unit 140, the selection unit 280, the arrangement control unit 340, and the analysis unit 380 in the surveillance apparatus 30. The processor 1040 realizes the function corresponding to each program module by reading each program module into the memory 1060 and executing the program module.

Next, the operation and the advantageous effect of the present example embodiment will be described. In the present example embodiment, the operation and the advantageous effect similar to those in the fifth example embodiment can be obtained.

Seventh Example Embodiment

Figure 19:
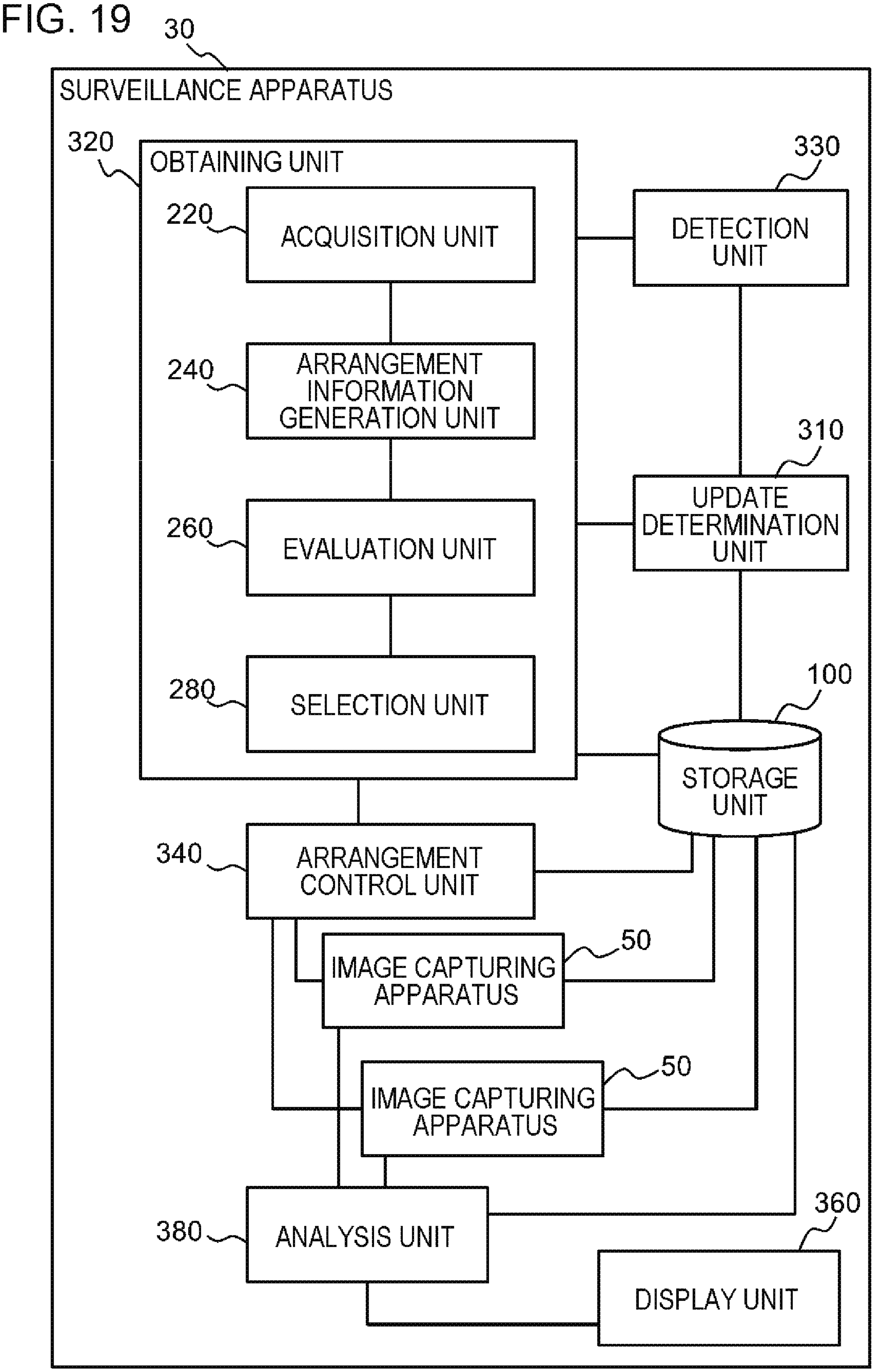
FIG. 19 is a block diagram illustrating a configuration of a surveillance apparatus according to a seventh example embodiment.

FIG. 19 is a block diagram illustrating a configuration of a surveillance apparatus 30 according to a seventh example embodiment. The surveillance apparatus 30 according to the present example embodiment is the same as the surveillance apparatus 30 according to the sixth example embodiment except for the points described below. In the surveillance apparatus 30 according to the present example embodiment, the obtaining unit 320 obtains the arrangement of the image capturing apparatus 50 at a plurality of timings based on predetermined conditions. Then, the arrangement control unit 340 controls the arrangement of the image capturing apparatus 50 every time the obtaining unit 320 obtains the arrangement of the image capturing apparatus 50. This will be described in detail below.

The surveillance apparatus 30 according to the present example embodiment acquires real-time information obtained on the spot and applies the information to the arrangement of the image capturing apparatus 50. In this manner, it is possible to realize an appropriate arrangement of the image capturing apparatus 50 in accordance with the actual situation.

The surveillance apparatus 30 according to the present example embodiment further includes a detection unit 330 and an update determination unit 310. The detection unit 330 is a camera, a sensor, or the like that detects the status of the target region 60. A portion of the detection unit 330 may also serve as the image capturing apparatus 50. The surveillance apparatus 30 may include a plurality of detection units 330. The detection unit 330 detects, for example, at least any of the density, the distribution, and the movement status of the target object 70 in the target region 60. Then, the obtained detection result is acquired by the acquisition unit 220 as the target object information. The detection unit 330 may detect, for example, the illuminance in at least a portion of the target region 60 and the position of the object 660. In this case, the obtained detection result is acquired by the acquisition unit 220 as the environmental information. It should be noted that, the detection target of the detection unit 330 is not limited to the above examples. The detection unit 330 can detect information that can be included in the arrangement information or the target object information described above, and the acquisition unit 220 can acquire the detection result as at least a portion of the arrangement information or the target object information.

The update determination unit 310 determines whether or not the arrangement of the image capturing apparatus 50 is to be updated. For example, update condition information indicating a condition of whether or not the arrangement is to be updated is stored in the storage unit 100 in advance. The update determination unit 310 reads the update condition information from the storage unit 100 and uses the update condition information for the determination. The update condition information is, for example, a time indicating an update interval or a time at which the update is to be performed. In a case where the update condition information is the time indicating the update interval, the update determination unit 310 causes the obtaining unit 320 to obtain the arrangement again when the elapsed time from the previous obtaining of the arrangement information is equal to or longer than the time indicating the update interval. In a case where the update condition information is the time at which the update is to be performed, the update determination unit 310 causes the obtaining unit 320 to obtain the arrangement again when the current time is the time at which the update is to be performed.

The update condition information may be, for example, a reference value regarding a difference between the environmental information or the target object information used for previously obtaining the arrangement information and the latest detection result obtained by the detection unit 330. For example, in a case where the difference is equal to or more than the reference value, the update determination unit 310 causes the obtaining unit 320 to obtain the arrangement again. This is because, in a case where the difference is large, the arrangement may not be suitable for the current situation.

It should be noted that, the user or the observer may perform an operation on the surveillance apparatus 30 to update the arrangement. In a case where the operation is performed, the update determining unit 310 may determine that the update condition is satisfied.

Figure 20:
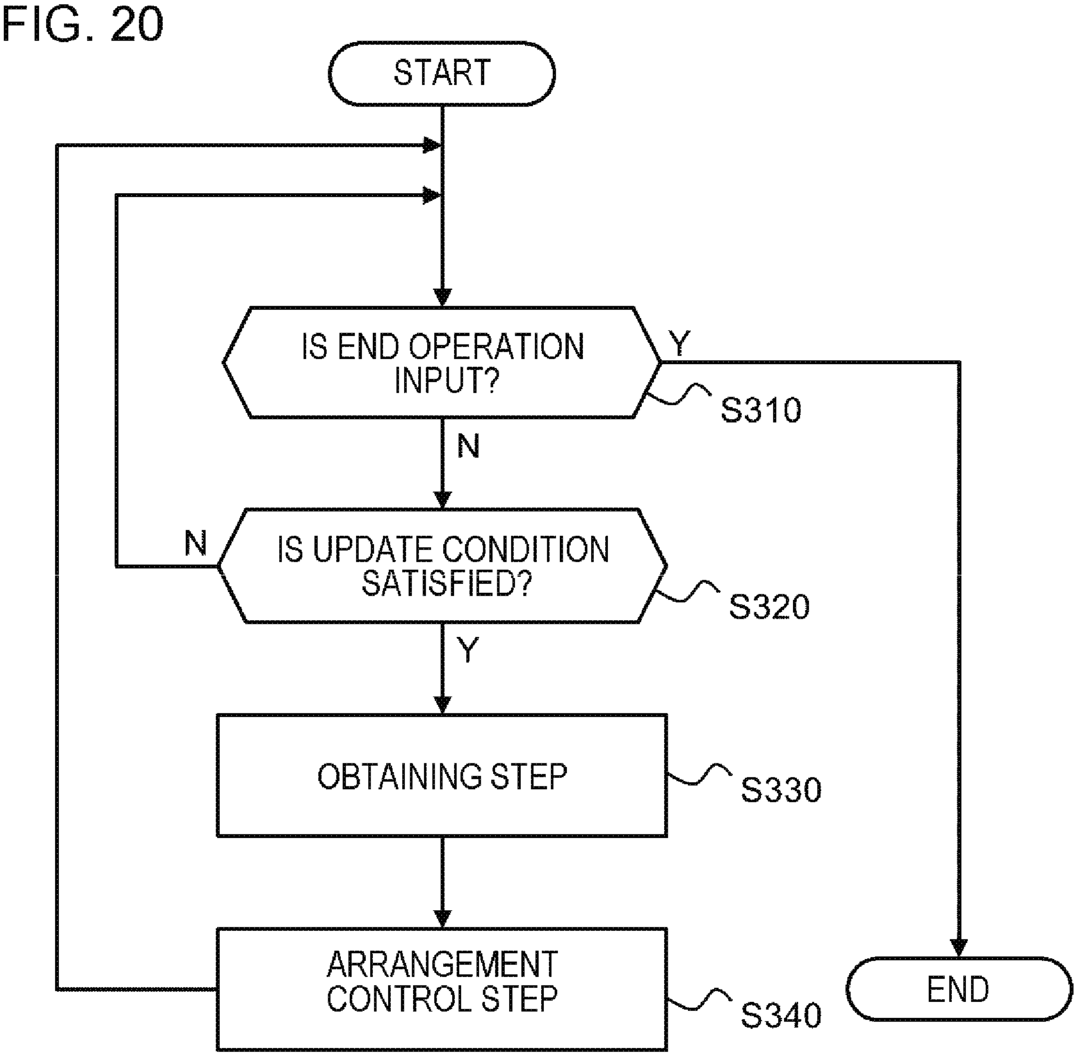
FIG. 20 is a flowchart illustrating contents of processing of updating the arrangement, which is performed by the surveillance apparatus according to the seventh example embodiment.

FIG. 20 is a flowchart illustrating contents of processing of updating the arrangement, which is performed by the surveillance apparatus 30 according to the seventh example embodiment. The surveillance method according to the present example embodiment includes the step S310, the step S320, the obtaining step S330, and the arrangement control step S340. When the surveillance apparatus 30 starts to update the arrangement, the update determination unit 310 determines, in Step S310, whether or not an end operation has been performed. In a case where the end operation has not been performed (N in Step S310), the update determination unit 310 then performs Step S320.

In Step S320, the update determination unit 310 determines whether or not the update condition is satisfied. In a case where the update condition is not satisfied (N in Step S320), the process returns to Step S310. In a case where the update condition is satisfied (Y in Step S320), the update determination unit 310 causes the obtaining unit 320 to obtain the arrangement of the image capturing apparatus 50. The obtaining unit 320 obtains the arrangement of the image capturing apparatus 50 in the obtaining step S330, and then the arrangement control unit 340 controls the arrangement of the image capturing apparatus 50 in the arrangement control step S340. The contents of the obtaining step S330 and the arrangement control step S340 are the same as the contents of the obtaining step S330 and the arrangement control step S340 in the sixth example embodiment, respectively. At this time, the obtaining unit 320 obtains the arrangement by using the latest detection result by the detection unit 330. It should be noted that, as a result of re-obtaining, the same arrangement may be obtained as the suitable arrangement.

Following the arrangement control step S340, the update determination unit 310 performs Step S310 again and repeats the above process until the end operation is performed. It should be noted that, in a case where the end operation is performed (Y in Step S310), the surveillance apparatus 30 ends the update of the arrangement.

It should be noted that, the image capturing apparatus 50, the analysis unit 380, and the display unit 360 continue to operate for surveilling the target region 60, while the step S310, the step S320, the obtaining step S330, and the arrangement control step S340 are performed.

The update determination unit 310 in the surveillance apparatus 30 according to the present example embodiment can be realized by, for example, the computer 1000 as illustrated in FIG. 12. The storage device 1080 further stores a program module that realizes the update determination unit 310 in the surveillance apparatus 30. The processor 1040 realizes the function corresponding to the program module by reading the program module into the memory 1060 and executing the program module. The detection unit 330 may be, for example, a sensor connected to the input and output interface 1100 or the network interface 1120.

Next, the operation and the advantageous effect of the present example embodiment will be described. In the present example embodiment, the operation and the advantageous effect similar to those in the fifth example embodiment can be obtained. In addition, it is possible to control the arrangement to which the real-time information by the detection unit 330 has been applied.

Hitherto, the example embodiments of the present invention have been described above with reference to the drawings. These are merely examples of the present invention, and various configurations other than the above description may be adopted. For example, in the sequence diagram and the flowchart used in the above description, a plurality of steps (processes) are described in order, but the execution order of the steps executed in each example embodiment is not limited to the order of the description. In the example embodiments, the order of the illustrated steps can be changed within a range without hindering the contents. In addition, the above-described example embodiments can be combined as long as the contents do not conflict with each other.

Some or all of the example embodiments described above can be described as the supplementary notes as follows, but the present invention is not limited to the followings.

1. An evaluation apparatus that evaluates an arrangement of one or more image capturing apparatuses that surveil a target region, the apparatus including:

an acquisition unit that acquires arrangement information and environmental information, the arrangement information indicating at least any of a position of the image capturing apparatus, an orientation of the image capturing apparatus, and a field angle of the image capturing apparatus, and the environmental information indicating an environment of the target region;

an index computation unit that computes, for each of a plurality of positions in the target region, a surveillance index by using the arrangement information and the environmental information, the surveillance index indicating difficulty or easiness of surveilling a target object in a case where the target object is located at the position; and a suitability computation unit that computes suitability of the arrangement of the image capturing apparatus, which is indicated by the arrangement information, based on distribution of the surveillance index in the target region.

2. The evaluation apparatus according to 1., in which the environmental information indicates at least any of a shape of the target region, a size of the target region, a position of an object placed in the target region, a shape of the object, a size of the object, and an orientation of the object.

3. The evaluation apparatus according to 1. or 2., in which the index computation unit computes the surveillance index based on at least any of a size, brightness, a hiding degree of the target object captured by the image capturing apparatus in a case where the target objects is located at each of the plurality of positions in the target region.

4. The evaluation apparatus according to any one of 1. to 3., in which the suitability computation unit specifies one or more surveillance-unsuitable regions based on distribution of the surveillance index in the target region, the surveillance-unsuitable regions in which it is difficult to surveil the target object by the image capturing apparatus, obtains a length of a route in a case where the target object passes through the surveillance-unsuitable region, for each of the surveillance-unsuitable regions, and computes the suitability based on the length of the route.

5. The evaluation apparatus according to 4., in which the acquisition unit further acquires information indicating a speed of a movement of the target object, and the suitability computation unit computes a transit time taken for the target object to pass through the surveillance-unsuitable region, based on the length of the route and the information indicating the speed of the target object, and computes the suitability based on the transit time.

6. The evaluation apparatus according to any one of 1. to 5., in which the acquisition unit further acquires information indicating a direction of a movement of the target object, and the index computation unit computes the surveillance index on the assumption that, as the direction of the movement of the target object becomes closer to a direction toward the image capturing apparatus, it is easier to surveil the target object.

7. The evaluation apparatus according to any one of 1. to 6., in which the acquisition unit further acquires information indicating density of a plurality of the target objects, and the index computation unit computes the surveillance index on the assumption that, as the density of the plurality of the target objects becomes higher, it is more difficult to surveil the target object.

8. An obtaining apparatus that obtains an arrangement of one or more image capturing apparatuses that surveil a target region, the apparatus including:

an acquisition unit that acquires condition information indicating a condition regarding the arrangement of the image capturing apparatus and environmental information indicating an environment of the target region;

an arrangement information generation unit that generates a plurality of pieces of arrangement information based on the condition information and the environmental information, the arrangement information indicating at least any of a position of the image capturing apparatus, an orientation of the image capturing apparatus, and a field angle of the image capturing apparatus;

an evaluation unit that evaluates each of the arrangements of the image capturing apparatus, which are indicated by the plurality of pieces of arrangement information; and a selection unit that selects one or more pieces of the arrangement information from among the plurality of pieces of arrangement information, based on an evaluation result of the evaluation unit, in which the evaluation unit includes an index computation unit that computes, for each of a plurality of positions in the target region, a surveillance index by using the arrangement information and the environmental information, the surveillance index indicating difficulty or easiness of surveilling a target object in a case where the target object is located at the position, and a suitability computation unit that computes suitability of the arrangement of the image capturing apparatus, which is indicated by the arrangement information, based on distribution of the surveillance index in the target region.

9. The obtaining apparatus according to 8., in which the environmental information indicates at least any of a shape of the target region, a size of the target region, a position of an object placed in the target region, a shape of the object, a size of the object, and an orientation of the object.

10. The obtaining apparatus according to 8. or 9., in which the index computation unit computes the surveillance index based on at least any of a size, brightness, a hiding degree of the target object captured by the image capturing apparatus in a case where the target objects is located at each of the plurality of positions in the target region.

11. In the obtaining apparatus according to any one of 8. to 10., in which the suitability computation unit specifies one or more surveillance-unsuitable regions based on distribution of the surveillance index in the target region, the surveillance-unsuitable regions in which it is difficult to surveil the target object by the image capturing apparatus, obtains a length of a route in a case where the target object passes through the surveillance-unsuitable region, for each of the surveillance-unsuitable regions, and computes the suitability based on the length of the route.

12. The obtaining apparatus according to 11., in which the acquisition unit further acquires information indicating a speed of a movement of the target object, and the suitability computation unit computes a transit time taken for the target object to pass through the surveillance-unsuitable region, based on the length of the route and the information indicating the speed of the target object, and computes the suitability based on the transit time.

13. The obtaining apparatus according to any one of 8. to 12., in which the acquisition unit further acquires information indicating a direction of a movement of the target object, and the index computation unit computes the surveillance index on the assumption that, as the direction of the movement of the target object becomes closer to a direction toward the image capturing apparatus, it is easier to surveil the target object.

14. The obtaining apparatus according to any one of 8. to 13., in which the acquisition unit further acquires information indicating density of a plurality of the target objects, and the index computation unit computes the surveillance index on the assumption that, as the density of the plurality of the target objects becomes higher, it is more difficult to surveil the target object.

15. A surveillance method of arranging the image capturing apparatus based on the arrangement determined using the evaluation apparatus according to any one of 1. to 7. or the obtaining apparatus according to any one of 8. to 14. and surveilling the target region.

16. A surveillance apparatus that surveils a target region with one or more image capturing apparatuses, the apparatus including:

an obtaining unit that obtains an arrangement of the image capturing apparatus; and an arrangement control unit that controls the arrangement of the image capturing apparatus based on the arrangement of the image capturing apparatus obtained by the obtaining unit, in which the obtaining unit includes an acquisition unit that acquires condition information indicating a condition regarding the arrangement of the image capturing apparatus and environmental information indicating an environment of the target region, an arrangement information generation unit that generates a plurality of pieces of arrangement information based on the condition information and the environmental information, the arrangement information indicating at least any of a position of the image capturing apparatus, an orientation of the image capturing apparatus, and a field angle of the image capturing apparatus, an evaluation unit that evaluates each of the arrangements of the image capturing apparatus, which are indicated by the plurality of pieces of arrangement information, and a selection unit that selects one or more pieces of the arrangement information from among the plurality of pieces of arrangement information, based on an evaluation result of the evaluation unit, and the evaluation unit includes an index computation unit that computes, for each of a plurality of positions in the target region, a surveillance index by using the arrangement information and the environmental information, the surveillance index indicating difficulty or easiness of surveilling a target object in a case where the target object is located at the position, and a suitability computation unit that computes suitability of the arrangement of the image capturing apparatus, which is indicated by the arrangement information, based on distribution of the surveillance index in the target region.

17. The surveillance apparatus according to 16., in which the obtaining unit obtains the arrangement of the image capturing apparatus for each of a plurality of time ranges, and the arrangement control unit controls the arrangement of the image capturing apparatus for each time range.

18. The surveillance apparatus according to 16., in which the obtaining unit obtains the arrangement of the image capturing apparatus at a plurality of timings based on a predetermined condition, and the arrangement control unit controls the arrangement of the image capturing apparatus every time the obtaining unit obtains the arrangement of the image capturing apparatus.

19. The surveillance apparatus according to any one of 16. to 18., in which the environmental information indicates at least any of a shape of the target region, a size of the target region, a position of an object placed in the target region, a shape of the object, a size of the object, and an orientation of the object.

20. The surveillance apparatus according to any one of 16. to 19., in which the index computation unit computes the surveillance index based on at least any of a size, brightness, a hiding degree of the target object captured by the image capturing apparatus in a case where the target object is located at each of the plurality of positions in the target region.

21. The surveillance apparatus according to any one of 16. to 20., in which the suitability computation unit specifies one or more surveillance-unsuitable regions based on distribution of the surveillance index in the target region, the surveillance-unsuitable regions in which it is difficult to surveil the target object by the image capturing apparatus, obtains a length of a route in a case where the target object passes through the surveillance-unsuitable region, for each of the surveillance-unsuitable regions, and computes the suitability based on the length of the route.

22. The surveillance apparatus according to 21., in which the acquisition unit further acquires information indicating a speed of a movement of the target object, and the suitability computation unit computes a transit time taken for the target object to pass through the surveillance-unsuitable region, based on the length of the route and the information indicating the speed of the target object, and computes the suitability based on the transit time.

23. The surveillance apparatus according to any one of 16. to 22., in which the acquisition unit further acquires information indicating a direction of a movement of the target object, and the index computation unit computes the surveillance index on the assumption that, as the direction of the movement of the target object becomes closer to a direction toward the image capturing apparatus, it is easier to surveil the target object.

24. The surveillance apparatus according to any one of 16. to 23., in which the acquisition unit further acquires information indicating density of a plurality of the target objects, and the index computation unit computes the surveillance index on the assumption that, as the density of the plurality of the target objects becomes higher, it is more difficult to surveil the target object.

25. An evaluation method of evaluating an arrangement of one or more image capturing apparatuses that surveil a target region, the method including:

an acquisition step of acquiring arrangement information and environmental information, the arrangement information indicating at least any of a position of the image capturing apparatus, an orientation of the image capturing apparatus, and a field angle of the image capturing apparatus, and the environmental information indicating an environment of the target region;

an index computation step of computing, for each of a plurality of positions in the target region, a surveillance index by using the arrangement information and the environmental information, the surveillance index indicating difficulty or easiness of surveilling a target object in a case where the target object is located at the position; and a suitability computation step of computing suitability of the arrangement of the image capturing apparatus, which is indicated by the arrangement information, based on distribution of the surveillance index in the target region.

26. The evaluation method according to 25., in which the environmental information indicates at least any of a shape of the target region, a size of the target region, a position of an object placed in the target region, a shape of the object, a size of the object, and an orientation of the object.

27. The evaluation method according to 25. or 26., in which in the index computation step, the surveillance index is computed based on at least any of a size, brightness, a hiding degree of the target object captured by the image capturing apparatus in a case where the target object is located at each of the plurality of positions in the target region.

28. The evaluation method according to any one of 25. to 27., in which in the suitability computation step, one or more surveillance-unsuitable regions are specified based on distribution of the surveillance index in the target region, the surveillance-unsuitable regions in which it is difficult to surveil the target object by the image capturing apparatus, a length of a route in a case where the target object passes through the surveillance-unsuitable region is obtained for each of the surveillance-unsuitable regions, and the suitability is computed based on the length of the route.

29. The evaluation method according to 28., in which in the acquisition step, information indicating a speed of a movement of the target object is further acquired, and in the suitability computation step, a transit time taken for the target object to pass through the surveillance-unsuitable region is computed based on the length of the route and the information indicating the speed of the target object, and the suitability is computed based on the transit time.

30. The evaluation method according to any one of 25. to 29., in which in the acquisition step, information indicating a direction of a movement of the target object is further acquired, and in the index computation step, the surveillance index is computed on the assumption that, as the direction of the movement of the target object becomes closer to a direction toward the image capturing apparatus, it is easier to surveil the target object.

31. The evaluation method according to any one of 25. to 30., in which in the acquisition step, information indicating density of a plurality of the target objects is further acquired, and in the index computation step, the surveillance index is computed on the assumption that, as the density of the plurality of the target objects becomes higher, it is more difficult to surveil the target object.

32. A computer program for realizing an evaluation apparatus that evaluates an arrangement of one or more image capturing apparatuses that surveil a target region, the program causing a computer to function as:

an acquisition unit that acquires arrangement information and environmental information, the arrangement information indicating at least any of a position of the image capturing apparatus, an orientation of the image capturing apparatus, and a field angle of the image capturing apparatus, and the environmental information indicating an environment of the target region;

an index computation unit that computes, for each of a plurality of positions in the target region, a surveillance index by using the arrangement information and the environmental information, the surveillance index indicating difficulty or easiness of surveilling a target object in a case where the target object is located at the position; and a suitability computation unit that computes suitability of the arrangement of the image capturing apparatus, which is indicated by the arrangement information, based on distribution of the surveillance index in the target region.

33. The computer program according to 32., in which the environmental information indicates at least any of a shape of the target region, a size of the target region, a position of an object placed in the target region, a shape of the object, a size of the object, and an orientation of the object.

34. The computer program according to 32. or 33., in which the index computation unit computes the surveillance index based on at least any of a size, brightness, a hiding degree of the target object captured by the image capturing apparatus in a case where the target object is located at each of the plurality of positions in the target region.

35. The computer program according to any one of 32. to 34., in which the suitability computation unit specifies one or more surveillance-unsuitable regions based on distribution of the surveillance index in the target region, the surveillance-unsuitable regions in which it is difficult to surveil the target object by the image capturing apparatus, obtains a length of a route in a case where the target object passes through the surveillance-unsuitable region, for each of the surveillance-unsuitable regions, and computes the suitability based on the length of the route.

36. The computer program according to 35., in which the acquisition unit further acquires information indicating a speed of a movement of the target object, and the suitability computation unit computes a transit time taken for the target object to pass through the surveillance-unsuitable region, based on the length of the route and the information indicating the speed of the target object, and computes the suitability based on the transit time.

37. The computer program according to any one of 32. to 36., in which the acquisition unit further acquires information indicating a direction of a movement of the target object, and the index computation unit computes the surveillance index on the assumption that, as the direction of the movement of the target object becomes closer to a direction toward the image capturing apparatus, it is easier to surveil the target object.

38. The computer program according to any one of 32. to 37., in which the acquisition unit further acquires information indicating density of a plurality of the target objects, and the index computation unit computes the surveillance index on the assumption that, as the density of the plurality of the target objects becomes higher, it is more difficult to surveil the target object.

39. An obtaining method of obtaining an arrangement of one or more image capturing apparatuses that surveil a target region, the method including:

an acquisition step of acquiring condition information indicating a condition regarding the arrangement of the image capturing apparatus and environmental information indicating an environment of the target region;

an arrangement information generation step of generating a plurality of pieces of arrangement information based on the condition information and the environmental information, the arrangement information indicating at least any of a position of the image capturing apparatus, an orientation of the image capturing apparatus, and a field angle of the image capturing apparatus;

an evaluation step of evaluating each of the arrangements of the image capturing apparatus, which are indicated by the plurality of pieces of arrangement information; and a selection step of selecting one or more pieces of the arrangement information from among the plurality of pieces of arrangement information, based on an evaluation result in the evaluation step, in which the evaluation step includes an index computation step of computing, for each of a plurality of positions in the target region, a surveillance index by using the arrangement information and the environmental information, the surveillance index indicating difficulty or easiness of surveilling a target object in a case where the target object is located at the position, and a suitability computation step of computing suitability of the arrangement of the image capturing apparatus, which is indicated by the arrangement information, based on distribution of the surveillance index in the target region.

40. The obtaining method according to 39., in which the environmental information indicates at least any of a shape of the target region, a size of the target region, a position of an object placed in the target region, a shape of the object, a size of the object, and an orientation of the object.

41. The obtaining method according to 39. or 40., in which in the index computation step, the surveillance index is computed based on at least any of a size, brightness, a hiding degree of the target object captured by the image capturing apparatus in a case where the target object is located at each of the plurality of positions in the target region.

42. The obtaining method according to any one of 39. to 41., in which in the suitability computation step, one or more surveillance-unsuitable regions in which it is difficult to surveil the target object by the image capturing apparatus is specified based on distribution of the surveillance index in the target region, a length of a route in a case where the target object passes through the surveillance-unsuitable region is obtained for each of the surveillance-unsuitable regions, and the suitability is computed based on the length of the route.

43. The obtaining method according to 42., in which in the acquisition step, information indicating a speed of a movement of the target object is further acquired, and in the suitability computation step, a transit time taken for the target object to pass through the surveillance-unsuitable region is computed based on the length of the route and the information indicating the speed of the target object, and the suitability is computed based on the transit time.

44. The obtaining method according to any one of 39. to 43., in which in the acquisition step, information indicating a direction of a movement of the target object is further acquired, and in the index computation step, the surveillance index is computed on the assumption that, as the direction of the movement of the target object becomes closer to a direction toward the image capturing apparatus, it is easier to surveil the target object.

45. The obtaining method according to any one of 39. to 44., in which in the acquisition step, information indicating density of a plurality of the target objects is further acquired, and in the index computation step, the surveillance index is computed on the assumption that, as the density of the plurality of the target objects becomes higher, it is more difficult to surveil the target object.

46. A computer program for realizing an obtaining apparatus that obtains an arrangement of one or more image capturing apparatuses that surveil a target region, the program causing a computer to function as:

an acquisition unit that acquires condition information indicating a condition regarding the arrangement of the image capturing apparatus and environmental information indicating an environment of the target region;

an arrangement information generation unit that generates a plurality of pieces of arrangement information based on the condition information and the environmental information, the arrangement information indicating at least any of a position of the image capturing apparatus, an orientation of the image capturing apparatus, and a field angle of the image capturing apparatus;

an evaluation unit that evaluates each of the arrangements of the image capturing apparatus, which are indicated by the plurality of pieces of arrangement information; and a selection unit that selects one or more pieces of the arrangement information from among the plurality of pieces of arrangement information, based on an evaluation result of the evaluation unit, in which the evaluation unit includes an index computation unit that computes, for each of a plurality of positions in the target region, a surveillance index by using the arrangement information and the environmental information, the surveillance index indicating difficulty or easiness of surveilling a target object in a case where the target object is located at the position, and a suitability computation unit that computes suitability of the arrangement of the image capturing apparatus, which is indicated by the arrangement information, based on distribution of the surveillance index in the target region.

47. The computer program according to 46., in which the environmental information indicates at least any of a shape of the target region, a size of the target region, a position of an object placed in the target region, a shape of the object, a size of the object, and an orientation of the object.

48. The computer program according to 46. or 47., in which the index computation unit computes the surveillance index based on at least any of a size, brightness, a hiding degree of the target object captured by the image capturing apparatus in a case where the target objects is located at each of the plurality of positions in the target region.

49. The computer program according to any one of 46. to 48., in which the suitability computation unit specifies one or more surveillance-unsuitable regions based on distribution of the surveillance index in the target region, the surveillance-unsuitable regions in which it is difficult to surveil the target object by the image capturing apparatus, obtains a length of a route in a case where the target object passes through the surveillance-unsuitable region, for each of the surveillance-unsuitable regions, and computes the suitability based on the length of the route.

50. The computer program according to 49., in which the acquisition unit further acquires information indicating a speed of a movement of the target object, and the suitability computation unit computes a transit time taken for the target object to pass through the surveillance-unsuitable region, based on the length of the route and the information indicating the transit time, and computes the suitability based on the length of the route.

51. The computer program according to any one of 46. to 50., in which the acquisition unit further acquires information indicating a direction of a movement of the target object, and the index computation unit computes the surveillance index on the assumption that, as the direction of the movement of the target object becomes closer to a direction toward the image capturing apparatus, it is easier to surveil the target object.

52. The computer program according to any one of 46. to 51., in which the acquisition unit further acquires information indicating density of a plurality of the target objects, and the index computation unit computes the surveillance index on the assumption that, as the density of the plurality of the target objects becomes higher, it is more difficult to surveil the target object.

53. A surveillance method of surveilling a target region with one or more image capturing apparatuses, the method including:

an obtaining step of obtaining an arrangement of the image capturing apparatus, and an arrangement control step of controlling the arrangement of the image capturing apparatus based on the arrangement of the image capturing apparatus obtained in the obtaining step, in which the obtaining step includes an acquisition step of acquiring condition information indicating a condition regarding the arrangement of the image capturing apparatus and environmental information indicating an environment of the target region, an arrangement information generation step of generating a plurality of pieces of arrangement information based on the condition information and the environmental information, the arrangement information indicating at least any of a position of the image capturing apparatus, an orientation of the image capturing apparatus, and a field angle of the image capturing apparatus, an evaluation step of evaluating each of the arrangements of the image capturing apparatus, which are indicated by the plurality of pieces of arrangement information, and a selection step of selecting one or more pieces of the arrangement information from among the plurality of pieces of arrangement information, based on an evaluation result in the evaluation step, in which the evaluation step includes an index computation step of computing, for each of a plurality of positions in the target region, a surveillance index by using the arrangement information and the environmental information, the surveillance index indicating difficulty or easiness of surveilling a target object in a case where the target object is located at the position, and a suitability computation step of computing suitability of the arrangement of the image capturing apparatus, which is indicated by the arrangement information, based on distribution of the surveillance index in the target region.

54. The surveillance method according to 53., in which in the obtaining step, the arrangement of the image capturing apparatus is obtained for each of a plurality of time ranges, and in the arrangement control step, the arrangement of the image capturing apparatus is controlled for each time range.

55. The surveillance method according to 53., in which in the obtaining step, the arrangement of the image capturing apparatus at a plurality of timings is obtained based on a predetermined condition, and in the arrangement control step, the arrangement of the image capturing apparatus is controlled every time the arrangement of the image capturing apparatus is obtained in the obtaining step.

56. The surveillance method according to any one of 53. to 55., in which the environmental information indicates at least any of a shape of the target region, a size of the target region, a position of an object placed in the target region, a shape of the object, a size of the object, and an orientation of the object.

57. The surveillance method according to any one of 53. to 56., in which in the index computation step, the surveillance index is computed based on at least any of a size, brightness, a hiding degree of the target object captured by the image capturing apparatus in a case where the target object is located at each of the plurality of positions in the target region.

58. The surveillance method according to any one of 53. to 57., in which in the suitability computation step, specifies one or more surveillance-unsuitable regions based on distribution of the surveillance index in the target region, the surveillance-unsuitable regions in which it is difficult to surveil the target object by the image capturing apparatus, obtains a length of a route in a case where the target object passes through the surveillance-unsuitable region, for each of the surveillance-unsuitable regions, and the suitability is computed based on the length of the route.

59. The surveillance method according to 58., in which in the acquisition step, information indicating a speed of a movement of the target object is further acquired, and in the suitability computation step, a transit time taken for the target object to pass through the surveillance-unsuitable region is computed based on the length of the route and the information indicating the speed of the target object, and the suitability is computed based on the transit time.

60. The surveillance method according to any one of 53. to 59., in which in the acquisition step, information indicating a direction of a movement of the target object is further acquired, and in the index computation step, the surveillance index is computed on the assumption that, as the direction of the movement of the target object becomes closer to a direction toward the image capturing apparatus, it is easier to surveil the target object.

61. The surveillance method according to any one of 53. to 60., in which in the acquisition step, information indicating density of a plurality of the target objects is further acquired, and in the index computation step, the surveillance index is computed on the assumption that, as the density of the plurality of the target objects becomes higher, it is more difficult to surveil the target object.

62. A computer program for realizing a surveillance apparatus that surveils a target region with one or more image capturing apparatuses, the program causing a computer to function as:

an obtaining unit that obtains an arrangement of the image capturing apparatus; and an arrangement control unit that controls the arrangement of the image capturing apparatus based on the arrangement of the image capturing apparatus obtained by the obtaining unit, in which the obtaining unit includes an acquisition unit that acquires condition information indicating a condition regarding the arrangement of the image capturing apparatus and environmental information indicating an environment of the target region, an arrangement information generation unit that generates a plurality of pieces of arrangement information based on the condition information and the environmental information, the arrangement information indicating at least any of a position of the image capturing apparatus, an orientation of the image capturing apparatus, and a field angle of the image capturing apparatus, an evaluation unit that evaluates each of the arrangements of the image capturing apparatus, which are indicated by the plurality of pieces of arrangement information, and a selection unit that selects one or more pieces of the arrangement information from among the plurality of pieces of arrangement information, based on an evaluation result of the evaluation unit, and the evaluation unit includes an index computation unit that computes, for each of a plurality of positions in the target region, a surveillance index by using the arrangement information and the environmental information, the surveillance index indicating difficulty or easiness of surveilling a target object in a case where the target object is located at the position, and a suitability computation unit that computes suitability of the arrangement of the image capturing apparatus, which is indicated by the arrangement information, based on distribution of the surveillance index in the target region.

63. The computer program according to 62., in which the obtaining unit obtains the arrangement of the image capturing apparatus for each of a plurality of time ranges, and the arrangement control unit controls the arrangement of the image capturing apparatus for each time range.

64. The computer program according to 62., in which the obtaining unit obtains the arrangement of the image capturing apparatus at a plurality of timings based on a predetermined condition, and the arrangement control unit controls the arrangement of the image capturing apparatus every time the obtaining unit obtains the arrangement of the image capturing apparatus.

65. The computer program according to any one of 62. to 64., in which the environmental information indicates at least any of a shape of the target region, a size of the target region, a position of an object placed in the target region, a shape of the object, a size of the object, and an orientation of the object.

66. The computer program according to any one of 62. to 65., in which the index computation unit computes the surveillance index based on at least any of a size, brightness, a hiding degree of the target object captured by the image capturing apparatus in a case where the target object is located at each of the plurality of positions in the target region.

67. The computer program according to any one of 62. to 66., in which the suitability computation unit specifies one or more surveillance-unsuitable regions based on distribution of the surveillance index in the target region, the surveillance-unsuitable regions in which it is difficult to surveil the target object by the image capturing apparatus, obtains a length of a route in a case where the target object passes through the surveillance-unsuitable region, for each of the surveillance-unsuitable regions, and computes the suitability based on the length of the route.

68. The computer program according to 67., in which the acquisition unit further acquires information indicating a speed of a movement of the target object, and the suitability computation unit computes a transit time taken for the target object to pass through the surveillance-unsuitable region, based on the length of the route and the information indicating the speed of the target object, and computes the suitability based on the transit time.

69. The computer program according to any one of 62. to 68., in which the acquisition unit further acquires information indicating a direction of a movement of the target object, and the index computation unit computes the surveillance index on the assumption that, as the direction of the movement of the target object becomes closer to a direction toward the image capturing apparatus, it is easier to surveil the target object.

70. The computer program according to any one of 62. to 69., in which the acquisition unit further acquires information indicating density of a plurality of the target objects, and the index computation unit computes the surveillance index on the assumption that, as the density of the plurality of the target objects becomes higher, it is more difficult to surveil the target object.

71. A surveillance apparatus that surveils a target region with one or more image capturing apparatuses, the apparatus including:

at least one of an analysis unit that analyzes an image captured by the image capturing apparatus and a display unit that displays the image, in which the image capturing apparatus is placed based on arrangement information obtained based on distribution of a surveillance index in the target region, the surveillance index is computed based on environmental information indicating an environment of the target region for each of a plurality of positions in the target region, and indicates difficulty or easiness of surveillance of a target object in a case where the target object is located at the position, and the arrangement information indicates at least any of a position of the image capturing apparatus, an orientation of the image capturing apparatus, and a field angle of the image capturing apparatus.

72. The surveillance apparatus according to 71., the environmental information includes information indicating that there is an elongated passage in the target region, and the image capturing apparatuses are arranged so that the orientations of the image capturing apparatuses coincide with each other in the elongated passage.

73. The surveillance apparatus according to 71. or 72., in which the environmental information includes information indicating that there is an elongated passage in the target region, two image capturing apparatuses are arranged in directions opposite to each other in a vicinity of a center of the elongated passage, an image of at least a region directly below one image capturing apparatus is captured by the other image capturing apparatus of the two image capturing apparatuses, and an image of at least a region directly below the other image capturing apparatus is captured by the one image capturing apparatus.

74. The surveillance apparatus according to any one of 71. to 73., in which the image capturing apparatus is placed so that a first region and a second region are not directly adjacent to each other and not adjacent to each other with only a blind spot region interposed between the first region and the second region, the first region is a region in which difficulty of surveillance indicated by the surveillance index is higher than a predetermined reference or easiness of the surveillance indicated by the surveillance index is lower than the reference, a first image capturing apparatus captures an image of the target object in a case where the target object is placed in the first region, the second region is a region in which the difficulty of the surveillance indicated by the surveillance index is higher than the reference or the easiness of the surveillance indicated by the surveillance index is lower than the reference, a second image capturing apparatus located within a predetermined range from the first image capturing apparatus captures the image of the target object in a case where the target object is placed in the second region, and any of the one or more image capturing apparatuses does not capture an image of at least a portion of the target object when the target object is placed in the blind spot region.

75. The surveillance apparatus according to any one of 71. to 74., in which the environmental information includes information indicating that a rectangular region is in the target region, and the image capturing apparatus is placed near a point closer to a center than to an end of a long side of the rectangle.

76. The surveillance apparatus according to any one of 71. to 75., in which the environmental information includes information indicating that a plurality of passages interposing one or more objects arranged in the target region are substantially in parallel in the target region, one image capturing apparatus is provided for each of the plurality of passages, and the image capturing apparatuses are arranged so that images of adjacent passages are captured from different directions.

What is claimed is:

1. A method executed by a computer, the method comprising:

receiving environmental information, the environmental information including information regarding an obstacle, receiving condition information, the condition information including a range corresponding to an area in which an unmanned aerial vehicle can fly, wherein the unmanned aerial vehicle comprises a camera;

receiving a movement status of a target object; and sending a control signal to the unmanned aerial vehicle based on the environmental information and the condition information, wherein:

in the process for sending the control signal, the computer causes a position of the unmanned aerial vehicle to be changed to track the target object in accordance with the movement status of the target object when there is a change in the movement status of the target object, the position of the unmanned aerial vehicle is determined in accordance with a candidate selected by a user from a plurality of candidates that are generated based on the environmental information and the condition information and displayed on a display, and the plurality of candidates includes a first candidate for changing the position of the unmanned aerial vehicle, based on a position of the obstacle, and a second candidate for changing the position of the unmanned aerial vehicle to a position different from the first candidate.

2. The method according to claim 1, wherein the method further comprises:

receiving an image captured by the camera, the image showing the target object; and adjusting an orientation of the camera to capture the target object after the image is captured.

3. The method according to claim 2, wherein the adjusting the orientation of the camera to capture the target object is executed in response to receiving a request by an input device.

4. The method according to claim 1, wherein the range indicates that the unmanned aerial vehicle can perform a task in an area.

5. The method according to claim 4, wherein the task includes surveillance.

6. The method according to claim 1, wherein the range indicates that the unmanned aerial vehicle cannot perform a task in an area.

7. A server machine, comprising:

at least one memory configured to store one or more instructions; and at least one processor configured to execute the one or more instructions to:

receive environmental information, the environmental information including information regarding an obstacle;

receive condition information, the condition information including a range corresponding to an area in which an unmanned aerial vehicle can fly, wherein the unmanned aerial vehicle comprises a camera;

receive a movement status of a target object; and send a control signal to the unmanned aerial vehicle based on the environmental information and the condition information, wherein:

in the process for sending the control signal, the server machine causes a position of the unmanned aerial vehicle to be changed to track the target object in accordance with the movement status of the target object when there is a change in the movement status of the target object, the position of the unmanned aerial vehicle is determined in accordance with a candidate selected by a user from a plurality of candidates that are generated based on the environmental information and the condition information and displayed on a display, and the plurality of candidates includes a first candidate for changing the position of the unmanned aerial vehicle, based on a position of the obstacle, and a second candidate for changing the position of the unmanned aerial vehicle to a position different from the first candidate.

8. The server machine according to claim 7, wherein the processor is further configured to execute the one or more instructions to:

receive an image captured by the camera, the image showing the target object; and adjust an orientation of the camera to capture the target object after the image is captured.

9. The server machine according to claim 8, wherein the adjusting the orientation of the camera to capture the target object is executed in response to receiving a request by an input device.

10. The server machine according to claim 7, wherein the range indicates that the unmanned aerial vehicle can perform a task in an area.

11. The server machine according to claim 10, wherein the task includes surveillance.

12. The server machine according to claim 7, wherein the range indicates that the unmanned aerial vehicle cannot perform a task in an area.

13. A system comprising:

an unmanned aerial vehicle comprising a camera;

an input and output interface comprising a display, the input and output interface is configured to receive input by a user and to display an image captured by the camera on a display; and a server machine which is connected to the input and output interface via wireless connection, the server machine comprising at least one memory storing instructions and at least one processor configured to execute instructions to:

receive environmental information, the environmental information including information regarding an obstacle;

receive condition information, the condition information including a range corresponding to an area in which the unmanned aerial vehicle can fly;

receive a movement status of a target object; and send a control signal to the unmanned aerial vehicle based on the environmental information and the condition information, wherein in the process for sending the control signal, the server machine causes a position of the unmanned aerial vehicle to be changed to track the target object in accordance with the movement status of the target object when there is a change in the movement status of the target object, the position of the unmanned aerial vehicle is determined in accordance with a candidate selected by a user from a plurality of candidates that are generated based on the environmental information and the condition information and displayed on a display, and the plurality of candidates includes a first candidate for changing the position of the unmanned aerial vehicle, based on a position of the obstacle, and a second candidate for changing the position of the unmanned aerial vehicle to a position different from the first candidate.

14. The system according to claim 13, wherein the server machine is further configured to execute instructions to:

receive an image captured by the camera, the image showing the target object; and adjust an orientation of the camera to capture the target object after the image is captured.

15. The system according to claim 14, wherein the adjusting the orientation of the camera to capture the target object is executed in response to receiving a request by an input device.

16. The system according to claim 13, wherein the range indicates that the unmanned aerial vehicle can perform a task in an area.

17. The system according to claim 16, wherein the task includes surveillance.

18. The system according to claim 13, wherein the range indicates that the unmanned aerial vehicle cannot perform a task in an area.

19. The method according to claim 1, wherein the second candidate changes the position of the unmanned aerial vehicle to a position different from the first candidate while constraining a change in an attitude of the camera.

20. The method according to claim 19, wherein the changing the position of the unmanned aerial vehicle while constraining the change in the attitude of the camera includes changing the position of the unmanned aerial vehicle so as to satisfy a constraint on at least one of an angular range of orientations that the camera can take, a range of fields of view that the camera can take, and an angular range of orientations that the camera cannot take.

* * * * *